US008321190B2

(12) United States Patent
Hansen et al.

(10) Patent No.: US 8,321,190 B2
(45) Date of Patent: Nov. 27, 2012

(54) FLOW SIMULATION IN A WELL OR PIPE

(75) Inventors: Jens Henrik Hansen, Charlottenlund (DK); Kristian Mogensen, Herlev (DK)

(73) Assignee: Maersk Olie & Gas A/S, Copenhagen K (DK)

( * ) Notice: Subject to any disclaimer, the term of this patent is extended or adjusted under 35 U.S.C. 154(b) by 661 days.

(21) Appl. No.: 12/302,231

(22) PCT Filed: May 24, 2006

(86) PCT No.: PCT/DK2006/000284
§ 371 (c)(1),
(2), (4) Date: Aug. 10, 2009

(87) PCT Pub. No.: WO2007/134598
PCT Pub. Date: Nov. 29, 2007

(65) Prior Publication Data
US 2009/0294122 A1 Dec. 3, 2009

(51) Int. Cl.
*G06G 7/48* (2006.01)
(52) U.S. Cl. .................... 703/10; 703/2; 702/6; 702/12; 166/305.1
(58) Field of Classification Search ............... 703/2, 9, 703/10; 166/244.1, 250.1, 305.1; 702/6, 702/9, 12
See application file for complete search history.

(56) References Cited

U.S. PATENT DOCUMENTS

| | | | |
|---|---|---|---|
| 3,948,324 A * | 4/1976 | Lybarger | 166/307 |
| 5,140,527 A * | 8/1992 | Jones et al. | 702/27 |
| 6,907,392 B2 | 6/2005 | Bennis et al. | |
| 7,647,136 B2 * | 1/2010 | McDowell | 700/282 |

FOREIGN PATENT DOCUMENTS

| | | |
|---|---|---|
| EP | 1184537 A2 | 8/2001 |
| WO | WO 01/40937 A1 | 6/2001 |

OTHER PUBLICATIONS

Fernandes et al, Drag Reduction in Horizontal Annular Two-Phase Flow, International Journal of Multiphase Flow, vol. 30, Iss. 9, Sep. 2004, pp. 1051-1069.*
Chin, W. Applications to Drilling and Production, Computational Rheology for Pipeline and Annular Flow, 2001, pp. 113-158.*
"The Relation Between the Lowering of the Piezometric Surface and the Rate and Duration of Discharge of a Well Using Ground-Water Storage", by Charles V. Theis, U.S. Geological Survey, Washington, D.C., 1935, pp. 27-32.
"Well Test Analysis", Rajagopal Raghavan, Prentice Hall Petroleum Engineering Series, 1993, pp. 42-96.

(Continued)

*Primary Examiner* — Russell Frejd
(74) *Attorney, Agent, or Firm* — Brinks Hofer Gilson & Lione

(57) ABSTRACT

A method of simulating fluid transport in a system for stimulating a well in a material formation of a resource reservoir, the system comprising a conduit element arranged in the well, the conduit element comprising a conduit wall including one or more openings for discharging a fluid into the material formation surrounding the conduit element; the method comprising establishing and numerically processing a transport model of fluid transport inside the conduit element. The transport model further includes a model of fluid transport in a predetermined space around the conduit element.

28 Claims, 9 Drawing Sheets

OTHER PUBLICATIONS

"Advances in Well Test Analysis", Robert C. Earlougher, Jr., Monograph vol. 5 of the Henry L. Doherty Series, Chapter 2, 1977, pp. 4-21.

"Controlled Acid Jet Technique (CAJ) for Effective Single Operation Stimulation of 14,000+ ft Long Reservoir Sections", by J.H. Hansen and N. Nederveen, SPE 78318, Paper presented at the SPE 13th European Petroleum Conference, Aberdeen, Scotland, Oct. 29-31, 2002, pp. 1-11.

"The Existence of an Optimum Damkohler Number for Matrix Stimulation of Carbonate Formations", Fredd, C.N., Tjia, R. and Fogler, H.S. (1997). SPE 38167, pp. 249-257.

"Drag Reduction in Rough Pipes" by P.S. Virk, J. Fluid Mech., vol. 45 (2), 225-246, (1971).

"A Unique Method for Perforating, Fracturing and Completing Horizontal Wells" by Damgaard, A.P., Bangert, D.S., Murray, D.J., Rubbo, R.P. and Stout, G.W. (1989), SPE 19282, pp. 61-69.

Crump, J.B. and Conway, M.W. (1986): "Effects of perforation entry friction on bottom hole treating analysis" (1986), SPE 15474., pp. 1041-1048.

Stehfest, H. (1970). Numerical Inversion of Laplace Transforms. Comm. ACM 13(1), 47-49.

L.D. Eckerfield, D. Zhu, A.D. Hill, J.A. Robert, K.M. Bartko: "Fluid placement model for horizontal well stimulation" SPE Drilling & Completion, vol. 15, No. 3, Sep. 30, 2000, pp. 185-190, XP002419305 Beijing.

Jonathan A. Holmes : "Modeling advanced wells in reservoir simulation" Journal of Petroleum Technology/ SPE, vol. 53, No. 11, Nov. 1, 2001, pp. 54-66, XP002419306 SPE 72493.

A. T. Jones, D. R. Davies: "Quantifying acid placement: the key to understanding damage removal in horizontal wells" Society of Petroleum Engineers, vol. SPE, No. 31146, Feb. 14, 1996, pp. 725-739, XP002419308 Lafayette.

G. Glasbergen, D. Van Batenburg, M. Van Domelen, R. Gdanski: "Field validation of acidizing wormhole models" Society of Petroleum Engineers, vol. SPE, No. 94695, May 25, 2005, pp. 1-11, XP002419309 Scheveningen.

Jukka Koskinen et al.: "CFD modelling of drag reduction effects in pipe flows" Society of Petroleum Engineers, vol. SPE, No. 81506, Jun. 9, 2003, pp. 1-11, XP002419307 Bahrain.

Ning Hsing Chen: "An explicit equation for friction factor in pipe" Ind. Eng. Chem. Fundamen., vol. 18, No. 3, Apr. 23, 1979, pp. 296-297, XP002428789.

P.S. Virk: "Drag reduction fundamentals" AICHE Journal, vol. 21, No. 4, Jul. 31, 1975, pp. 625-656, XP002428787 India.

P.J. Hamersma, J.M.H. Fortuin: "Effect of drag reducers on transport phenomena in turbulent pipe flow" AICHE Journal, vol. 49, No. 2, Feb. 28, 2003, pp. 335-349, XP002428788 Amsterdam.

N. Singhal, S.N. Shah, S. Jain: "Friction pressure correlations for newtonian and non-newtonian fluids in concentric annuli" Society of Petroleum Engineers, No. 94280, Apr. 17-19, 2005 pp. 1-10, XP002428842 Oklahoma City.

M. Buijse, G. Glasbergen: "A semi empirical model to calculate wormhole growth in carbonate acidizing" Society of Petroleum Engineers, No. 96892, Oct. 9-12, 2005 pp. 1-14, XP002428976 Dallas.

M. K. R. Panga, M. Ziauddin, V. Balakotaiah: "Two-scale continuum model for simulation of wormholes in carbonate acidization" AICHE Journal, vol. 51, No. 12, Sep. 6, 2005, pp. 3231-3248, XP002428977.

T. Huang, D. Zhu, A.D. Hill: "Prediction of wormhole population density in carbonate matrix acidizing" Society of Petroleum Engineers, No. 54723, May 31, 1999-Jun. 1, 1999 pp. 1-11, XP002428978.

Search Report for PCT Application No. PCT/DK2006/000284, 7 pages, Apr. 23, 2007.

International Preliminary Report on Patentability for PCT Application No. PCT/DK2006/000284, 10 pages, Nov. 4, 2008.

\* cited by examiner

FLOW SIMULATION IN A WELL OR PIPE

This application is a filing under 35 U.S.C. §371 of International Patent Application PCT/DK2006/000284, filed May 24, 2006.

TECHNICAL FIELD

Disclosed are methods for simulating material transport in a pipe or well.

BACKGROUND AND STATE OF THE ART

Horizontal wells with continuous reservoir sections exceeding 10,000 ft are being used for the development of a number of oil fields, e.g. the laterally extensive low permeability chalk in the Dan/Halfdan oil accumulation as well as on a number of other fields located in the Danish part of the North Sea.

To avoid the risk of a hole collapse as a result of drilling, the wells are typically cased off with intermediate casings, including the reservoir section, denoted the pay zone. In wells with large pressure gradients along the well bore, a traditional completion strategy involves installation of a cemented liner with an inner string, the tubing, extending all the way to the surface. Operational experience has demonstrated that such an approach, known as the Perforate-Stimulate-Isolate (PSI) system, is costly and yields modest well productivity when wells are acid-stimulated below fracturing conditions.

EP 1 184 537 describes an improved method of stimulating a well referred to as the Controlled Acid Jet (CAJ) liner approach allowing stimulation of even very long horizontal well sections in a single operation. The CAJ liner is a non-cemented liner with a limited number of unevenly spaced holes (perforations) which ensures efficient acid stimulation of the complete reservoir section, provided the acid is pumped at sufficiently high rates to enable complete displacement of a mud phase built up along the bore hole walls. The article "Controlled Acid Jet Technique (CAJ) for Effective Single Operation Stimulation of 14,000+ ft Long Reservoir Sections", by J. H. Hansen and N. Nederveen, SPE 78318, Paper presented at the SPE 13th European Petroleum Conference, Aberdeen, Scotland, 29-31 Oct. 2002, describes the CAJ liner concept in greater detail. CAJ liners can be installed in combination with traditional cemented liners or they can be deployed to cover the entire reservoir interval in case selective water shut-off is not mandatory.

The CAJ liner has, in several ways, set new standards for the completion and stimulation of long horizontal wells. One of the significant achievements with the CAJ liners is the remarkably effective acid coverage resulting from stimulation of long reservoir sections in a single operation. A typical CAJ liner length represents more than 20 times the interval length covered during matrix acid stimulation in a traditional cemented and perforated liner, completed with the PSI system. Furthermore, CAJ liners show consistently better productivity per unit reservoir length than cemented liners. In the Danish part of the North Sea, CAJ liners have to date been installed in more than 80 wells covering a perforated interval of some 650,000 ft.

During the stimulation of an oil well, making best possible use of the stimulation fluid and maximizing well productivity are matters of great importance. Consequently, it is desirable to model or simulate such stimulation processes so as to determine process parameters including suitable stimulation schedules that provide a good utilisation of the stimulation fluid and a high well productivity. Unfortunately such modelling and simulation require significant computational efforts, and an accurate simulation of the transient, i.e. time-dependant aspects of material flow in such systems is difficult to achieve.

There have been attempts to model the stimulation of wells, e.g. by employing an experimental approach such as the one described in "The Existence of an Optimum Damköhler Number for Matrix Stimulation of Carbonate Formations", Fredd, C. N., Tjia, R. And Fogler, H. S. (1997). SPE 38167, where core flood results are used to predict an optimum pump rate. However, it remains uncertain how such approaches perform in practical field applications.

Furthermore, there have also been modelling attempts that incorporate reservoir properties but only under steady-state conditions, thus falling short to simulate transient behaviour. Finally, some time-dependent effects have been modelled but only for comparably small reservoir sections containing a cemented liner.

SUMMARY OF THE INVENTION

It is thus an object of the present invention to provide an accurate and efficient numerical solution strategy for analyzing transient, i.e. time-dependent, aspects during material transport in the above systems, in particular in the context of acid stimulation of long horizontal wells completed in a carbonate reservoir with a CAJ liner.

According to a first aspect, it has turned out that the accuracy of simulations of fluid transport in a system for stimulating a well in a material formation of a resource reservoir can significantly be improved when the transport model further includes a model of material transport in a predetermined space around said conduit element. Consequently the combined flow in the conduit element such as the liner of a CAJ liner system, and in an annulus surrounding the liner is modelled, thereby providing a more accurate representation of the well-bore geometry which results in an improved modelling accuracy and providing an improved construction and operation of the stimulation system. In particular, incorporation of annulus cells in the model improves the modelling of the displacement of mud by acid, since mud flow in the annulus in the opposite direction compared to the flow inside the liner can be represented correctly.

When wells are drilled in tight, mature reservoirs, pressure gradients that exceed 1,000 psi along the well are not uncommon. Furthermore, individual reservoir layers may be very thin, i.e. wells typically penetrate several units. Traditional pressure transient analysis is not well suited for simulation of the stimulation process of such wells, because they either ignore the varying reservoir properties or omit the flow distribution in the liner, or both. It is thus an advantage of embodiments of the method described herein that they use a fine-gridded model of the liner, annulus, and reservoir sections, preferably with local-grid refinement, i.e. volume cells of different size.

It is a further advantage of the above-described method that it is suitable for many types of well bore geometry, including varying factors such as trajectory, varying tubing and liner sizes, casing depths, coil movement inside the tubing during operation, etc., since the fine gridded model adequately captures the effect of geometry on the pressure distribution in the well.

Effective displacement of the mud is an important issue in very long horizontal wells. It is generally desirable to design the completion and stimulation of a well so as to ensure not only a good acid coverage, but also a large effective well bore radius in even the outer parts of the well. Simulation of mud displacement is numerically challenging due to the rheological properties of the mud. In an embodiment of the invention these obstacles are overcome when a Newton-Raphson method with an under-relaxation parameter is used for solving flow equations of the model.

According to a second aspect, it is an object of the invention to improve the accuracy of the simulation by providing a more accurate modelling of the friction loss during the transport of the stimulation fluid through the conduit.

In particular, the friction pressure loss encountered in the fluid during the stimulation process is an important parameter for the design of the completion and stimulation of a well. It has a large impact on the optimum number, size and location of the holes in the CAJ liner. The friction pressure loss depends on the geometry of the well, the (temperature dependant) fluid properties and the pump rate. A drag reducing agent (typically a long chain polymer) is typically added to the fluid to decrease the friction pressure loss. The chemicals are added in concentrations of some ppt (%).

The above and other problems are solved by a method of simulating fluid transport through a conduit surrounded by a wall, the fluid including a drag reducing agent; the method comprising
  establishing a transport model including a model of a pressure drop along said conduit, the model of the pressure drop being adapted to model the pressure drop as a function of at least a friction factor indicative of a friction drag incurred during transport of said fluid in the conduit;
  estimating the friction factor from a friction model relating the friction factor to at least a roughness parameter indicative of a roughness of said wall;
wherein the friction model further relates the friction factor to a parameter indicative of a property of the drag reducing agent.

Consequently, the fluid properties including those of drag-reducing agents are taking into account when calculating the friction factor for relevant operating conditions. According to preferred embodiments, accurate simulation models have been developed that incorporate properties of the drag-reducer as well as the pipe roughness.

In embodiments of the present invention an equation has been developed to describe the effect of adding drag reducers to Newtonian fluids in rough pipes. The advantages include a much higher accuracy of the model at low concentrations of the drag reducer. The drag reducer is a very expensive and environmentally questionable chemical the use of which should be optimised to the extent possible. Additionally the effect of the drag reducing chemical is very dependent on the pumping rate, which changes during the stimulation job. Therefore the optimisation is quite complex and it is an advantage of embodiments of the present invention that they provide a transient simulation process.

The effect of the well stimulation by acid depends on the conditions for the growth of flow channels, also referred to as wormholes. To this end, the choice of the right pump rate is one of the important parameters for optimal well stimulation: If the acid is pumped at a too low or too high rate, the growth of wormholes may be insignificant, whereas the optimum rate is associated with a significant formation of wormholes. The optimum rate of acid into a wormhole may depend on the geometry of the wormhole, type and concentration of acid, temperature etc.

The wormholing process may be viewed as follows: Initially the acid jets holes through the mud cake, then wormholes start to form. When the wormholes are small there will be many of them, but when they grow in length in a radial pattern away from the well bore the number of active wormholes will decrease. Thus the number and length of wormholes change with time. Therefore it is also important to change the acid injection rate accordingly during the stimulation job to promote growth of a dominating wormhole rather than to induce face dissolution. Hence, it is desirable to provide an efficient and accurate modelling of the wormholing process, in order to facilitate an optimal choice of process parameters.

According to a third aspect, the model accuracy has been improved by providing a method of simulating transport of a fluid for causing a dissolution process of at least a part of a material of a material formation surrounding the conduit, the conduit having a conduit radius; the method comprising establishing a transport model of fluid transport along a longitudinal axis of the conduit, the transport model including a model of a lateral fluid transport away from said longitudinal axis into the material formation; wherein the method comprises calculating an effective conduit radius dependant on at least one parameter indicative of an estimated distribution of flow channels generated in the material formation by the dissolution process.

It has turned out that embodiments of the model described herein provide an accurate simulation of the generation of flow channels/wormholes. The model described herein has been found to be in good agreement with the characteristic etching patterns published by Fredd et al. (ibid.).

In embodiments of the method described herein, semi-empirical expressions for the wormhole density and the relation to the effective well-bore radius are utilised that provide a particularly accurate modelling. In particular, from laboratory tests the optimum pump rate in linear flow is known to correlate with the Damköhler number. An interesting feature of embodiments of the methods described herein is the scaling of such linear core flooding results to radial reservoir conditions, which enables matching of the observed bottom-hole pressures as a function of time.

In one embodiment, the different flow models described herein are combined so as to result in a non-linear system of equations. In some embodiments the model is solved in a fast and reliable manner by means of a multi-variable Newton-Raphson iterative scheme with under-relaxation.

The present invention relates to different aspects including the methods described above and in the following, corresponding data processing device, and computer programs, each yielding one or more of the benefits and advantages described in connection with the above-mentioned methods, and each having one or more embodiments corresponding to the embodiments described in connection with the above-mentioned methods.

More specifically, according to another aspect, a data processing system is configured to perform the steps of the method described herein.

The term data processing system is intended to comprise any electronic system or device comprising processing means for data processing. In particular, the term processing system is intended to comprise any suitably programmed computer, such as a desktop computer, computer workstation, or the like, or any other electronic equipment including handheld or portable computing devices, such as handheld computers, or the like.

It is noted that the features of the methods described above and in the following may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

Hence, according to another aspect, a computer program comprises program code means adapted to cause a data processing device to perform the steps of the method described above and in the following, when said computer program is run on the data processing device.

For example, the program code means may be loaded in a memory, such as a RAM (Random Access Memory), from a storage medium or from another computer via a computer network. Alternatively, the described features may be implemented by hardwired circuitry instead of software or in combination with software.

The term storage medium is intended to include any circuitry or device suitable for storing digital data items. Examples of such storage media include non-volatile memory, a read-only-memory (ROM), a random access memory (RAM), a flash memory, an Erasable Programmable Read-Only Memory (EPROM), or the like. In some embodiments, the storage medium is included in the processing device.

According to yet another aspect, the invention relates to a method of stimulating a well by means of a well stimulation system for performing a stimulation process. The method comprises:
  performing a simulation by performing the steps of the method described herein;
  selecting at least a construction parameter of the well stimulation system or a process parameter of the stimulation process based on a result of the stimulation;
  performing the stimulation process with the selected construction parameter of process parameter.

BRIEF DESCRIPTION OF THE DRAWINGS

The above and other aspects will be apparent and elucidated from the embodiments described in the following with reference to the drawing in which.

DETAILED DESCRIPTION

Figure 1:
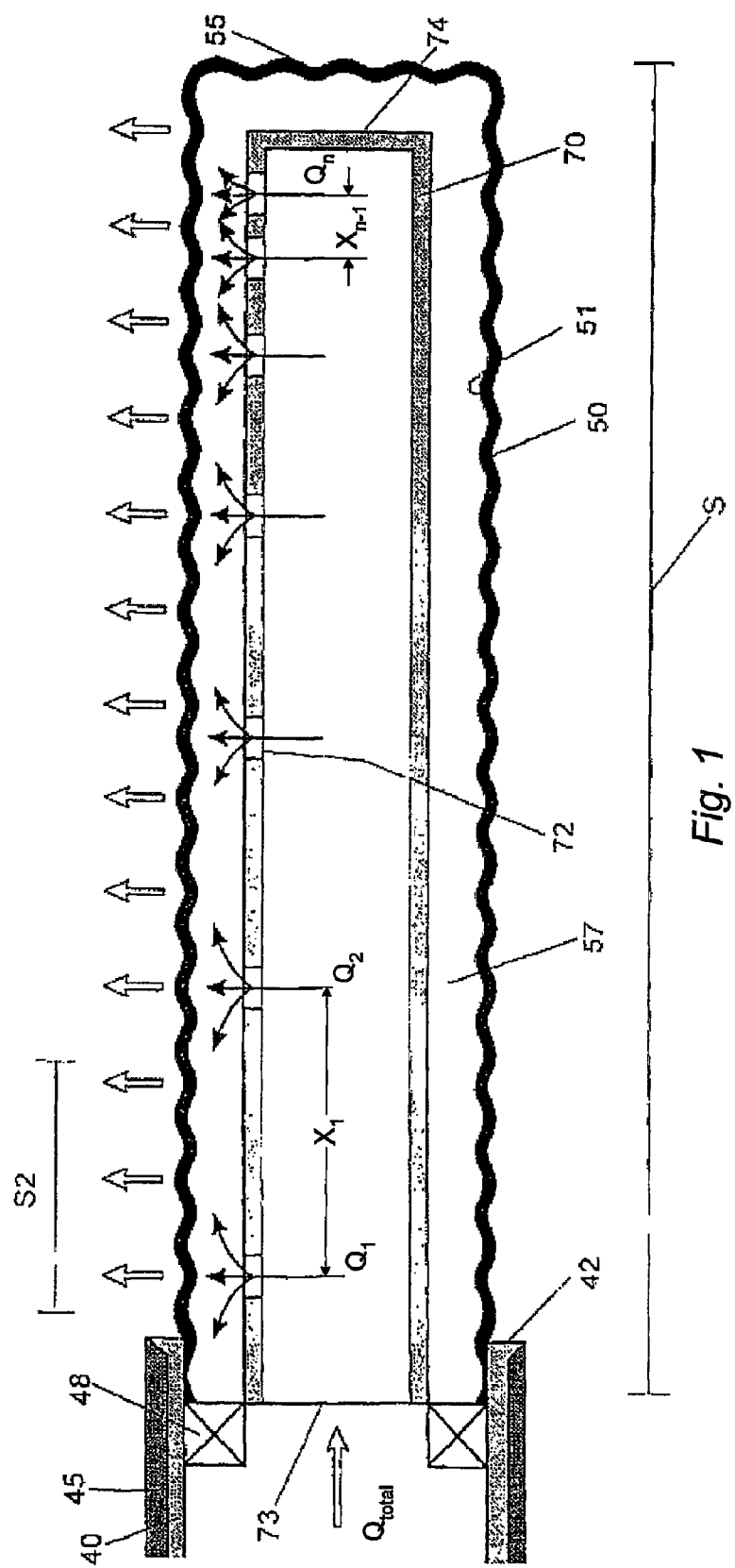
FIG. 1 shows schematic a schematic cross-sectional view of a bore-hole and the completion of a CAJ liner.

FIG. 1 shows a schematic cross-sectional view of a borehole and the completion of a CAJ liner. In particular, FIG. 1 illustrates the horizontal portion of a well bore 50 for the production of oil or gas from a reservoir. The well bore 50 as such is conventionally established by drilling with drill bits having decreasing operation diameter in a manner known as such and described in e.g. EP1184537.

When the drill bit has reached the desired reservoir section, a so-called reservoir liner 40 is introduced, and cement is pumped down to form an isolation 45 between the outside of the reservoir liner 40 and the wall of the well bore 50 in the reservoir 1. Then drilling is continued to provide the end section S of the well bore 50 that extends within the reservoir 1 past the end 42 of the reservoir liner 40.

A stimulation liner/tubing 70 is introduced into the end section S by means of conventional introduction equipment, and the production tubing (not shown) is introduced into the reservoir tubing 40. The liner 70 that has a first open end 73 is located so as to extend approximately from the end 42 of the reservoir liner to the end 55 of the well bore 50. Acid is supplied via the production tubing and the opposite end 74 of the liner 70 is typically closed. The first end 73 of the liner 70 is preferably attached to the inner wall of the reservoir liner 40 by means of a conventional packer 48. The liner 70 has a diameter that is smaller than the diameter of the well bore 50. Thus, between the outer surface of the liner 70 and the exposed surface 51 of the well bore 50 a space 57 appears. The space 57 is generally annular. However, in practice the liner 70 often has a slightly curved forward course within the section S and may abut to the surface of the well bore 50 along a modest part of the periphery of the liner 70.

The stimulation liner 70 is provided with a number of pre-formed openings 72 that form flow passages between the interior of the liner 70 and the annular space 57. The openings 72 have a shape and location that comply with particular, pre-defined specifications. Typically, the distances $X_1 \ldots X_n$ between adjacent openings along the liner 70 decrease towards the end 55 of the bore well 50.

Generally the drilling process gives rise to the formation of a compacted layer of drilling mud on the wall or the surface 51 of the well bore 50. The drilling mud is decomposed by supply of acid via the tube 70 to the end section S before production of oil or gas can be initiated, thereby ensuring homogenous decomposition of the drilling mud.

The above completion and stimulation system is generally referred to as Controlled Acid Jet (CAJ) liner, since the distribution of acid jetted onto the formation along the entire non-cemented liner is controlled by a limited number of pre-drilled holes. The acid is pumped at high rates and exits the holes at high velocities resulting in jetting of the formation. By limiting the number and size of holes, a choke effect is obtained and a significant pressure drop occurs between the inside and the outside of the liner during stimulation. A non-uniform geometric distribution of the holes is used to compensate for the friction pressure drop along the liner section. This means that the average hole spacing decreases towards the bottom of the CAJ liner. The open annulus 57 outside the liner in combination with the overpressure on the inside of the liner (due to the choking over the holes) ensures that the acid eventually reaches the bottom of the very long liner, and the well is thus stimulated along its full length.

Figure 2:
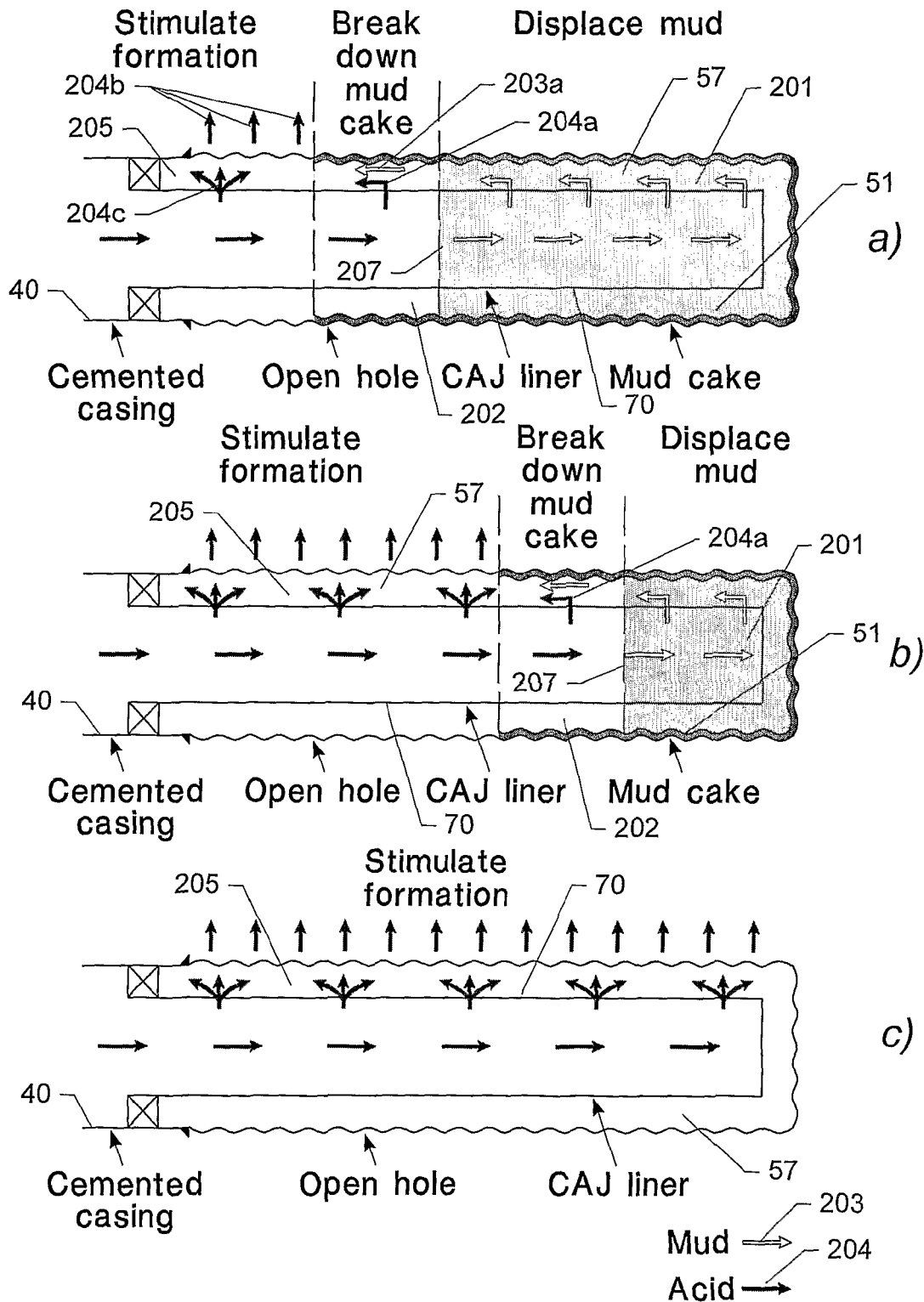
FIG. 2 illustrates the mud displacement process in a CAJ liner.

FIG. 2 illustrates the mud displacement process in a CAJ liner. In particular, FIGS. 2a-c show the bore well with the liner at consecutive times during the stimulation by injection of acid. Mud flow is illustrated by light arrows 203, while acid flow is illustrated by black arrows 204. Initially, both the liner 70 and liner-well bore annulus 57 are filled with mud as indicated by the dark shaded area 201. Also, a high resistance to flow exists at the well bore face (mud cake) 51, which is referred to as skin.

In FIG. 2a, the acid has started to hit the formation at the top sections 202 and 205 of the liner, i.e. the sections proximal to the cemented reservoir liner 40. Consequently, the mud cake and the formation will break down and considerable fluid volumes start leaking off to the formation as illustrated by arrows 204b. The break down of the mud cake is illustrated by the light shaded area 202. Hence, as soon as an effective connection to the reservoir has been established, the stimulation pressure will fall, assuming constant stimulation rates. At this stage of the stimulation job, the fluid leak-off 204b into the top of the reservoir section is a mixture of acid jetting out of the pre-drilled liner holes (arrows 204c) in the top section of the CAJ liner and fluids flowing from the more distant part of the liner annulus in the direction of the heel of the well as illustrated by arrows 203a and 204a. Thus, as the acid front 207 moves along the liner, a break down zone 202 is created, where acid mixes with the mud and breaks down the mud and the mud cake 51.

Eventually, when all mud is broken down and residuals displaced into the formation, the annulus will be fully filled with acid, as illustrated by FIG. 2c. There will continue to be a net flow towards the sections with the least resistance in the well, and the acid flowing towards these sections will wash the well bore face. Fresh acid will continue to be jetted at the predetermined distribution points along the CAJ liner, ensuring effective stimulation along the full liner length by acid flow in the annulus.

Hence, the problem of covering sufficiently long reservoir sections in each zone due to the high reactivity between acid and chalk has been addressed by the development of the CAJ liner. Furthermore the optimal implementation of the CAJ liner technology is complicated due to the complex interaction between the many different physical and chemical processes taking place during the stimulation. For example, the distribution of openings along the liner and the pump schedule for the pumping of acid into the liner are important parameters, and their optimisation based on a simulation of the stimulation process is highly desirable.

Modelling Fluid Transport:

In the following, an embodiment of a simulation process based on a finite-difference model for analyzing a stimulation process in oil or gas wells will be described in greater detail.

Figure 3A:
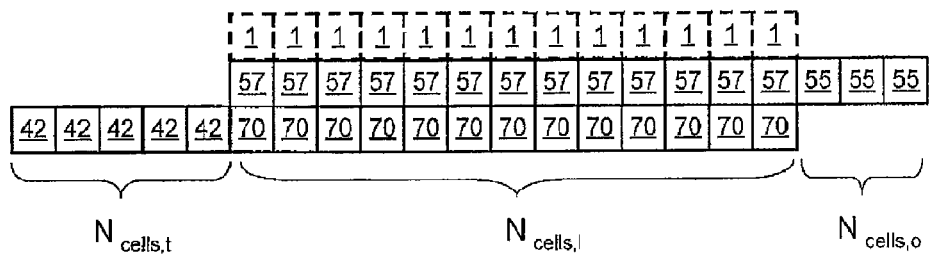
FIG. 3 illustrates the model structure of a discrete model of a CAJ liner conduit.

FIG. 3 illustrates the model structure of a discrete model of a CAJ liner conduit. Numerical solution of the fundamental partial differential equations governing fluid flow from the wellhead to the reservoir is greatly facilitated by a discretization in time and space by way of a finite-difference model. Spatial discretization is achieved by representing the CAJ liner and the tubing as a number of connected cells belonging to a grid, as illustrated schematically in FIG. 3a. The liner 70 is modelled as a first sequence of volume cells 70, the annulus between liner and formation is modelled by a corresponding second sequence of cells 57, and the formation is modelled by a third sequence of volume cells 1. The Introduction of annulus cells in the model enables flow in the annulus, which in turn means that the acid is able to reach the end of the liner.

Each cell has a number of parameters associated with it indicative of the transport properties in the cell. For example, the reservoir cells have parameters associated with it indicative of the reservoir properties at the corresponding position along the well.

The cell ordering illustrated in FIG. 3 vastly reduces the required number of matrix operations since the well-known Gauss elimination technique can be tailored to work only on the non-zero matrix elements.

Figure 3B:
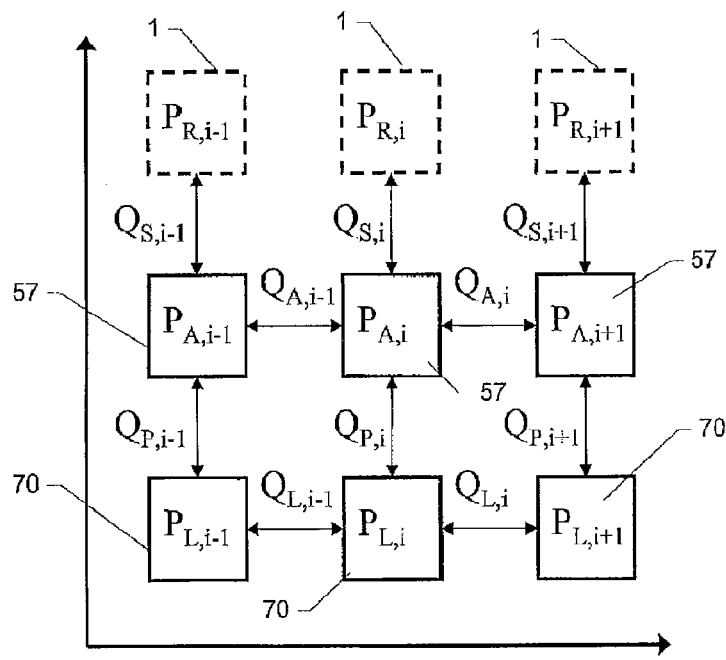
Figure 3C:
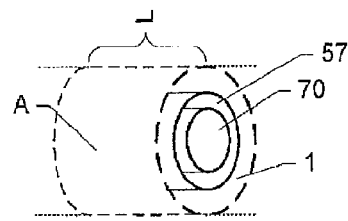

FIG. 3c illustrates a schematic view of a bore hole section represented by a liner cell 70, an annulus cell 57, and a reservoir cell 1.

Even though the cells in FIG. 3 are shown as equal sized, it will be appreciated that the cells may represent different volumes. For example, the liner cells 70 may correspond to different lengths of the liner. In particular, in some embodiments, the cells located at positions of the openings in the liner are smaller (in particular have a shorter length L), than the cells between openings, thereby providing an accurate modelling of the flow through the openings, while providing a computationally efficient modelling of even large systems.

The model may further include cells 42 representing the tubing section, and cells 55 representing the distant part of the bore hole into which the liner does not extend, i.e. proximal to the toe of the well. The inclusion of cells 42 improves the simulation of the pressure drop between the pumps and the CAJ liner. Cells 55 improve the simulation of the pressure response during simulation.

Hence, in this embodiment, the discretization in space is achieved by discretizing the liner and the annulus around the liner in the longitudinal direction along the liner. Furthermore, the surrounding reservoir is discretized in the longitudinal direction. Consequently, this embodiment of the model comprises a single longitudinal sequence of volume cells for each type of cells, i.e. for each of the annular/radial elements of the system.

Discretization in time is achieved by simulating fluid advance in the system of cells in a sequence of discrete time steps, wherein certain conditions, such as a condition of fluid incompressibility in the well bore are imposed. Furthermore, the time step is determined based on the cell filling sequence to avoid problems with numerical dispersion as will be described below.

FIG. 3b shows an enlarged view of a section of the model and illustrates the nomenclature and the definition of positive flow direction. The flow direction is positive towards the toe of the well and into the reservoir from the well. In particular, FIG. 3b illustrates the main variables representing the fluid transport between neighbouring cells, namely the pressure P in each cell, and the flow Q from one cell to the neighbouring cell. Flow between liner cells is affected by friction pressure and hydrostatic head.

Tables 1-3 include a nomenclature of the notations generally used in the present description.

TABLE 1

| Roman symbols | | |
|---|---|---|
| Symbol | Variable | Unit |
| a | Damköhler number parameter | |
| A | Surface area | $ft^2$ |
| B | Formation volume factor | rb/bbl |
| c | Compressibility | $psi^{-1}$ |
| C | Concentration | ppt, M |
| $C_d$ | Discharge coefficient | |
| D | Diameter | in |
| $D_1$ | Inner tubing/liner diameter | in |
| $D_2$ | Outer tubing/liner diameter | in |
| $D_3$ | Inner casing/annulus diameter | in |
| $D_a$ | Damköhler number (transport-limited) | |
| $D_{\mathit{eff}}$ | Effective diffusion coefficient | |
| Ei | Exponential integral function | |

TABLE 1-continued

Roman symbols

| Symbol | Variable | Unit |
|---|---|---|
| f | Fanning friction factor | |
| F | Function | |
| F | Wormhole model scaling factor | |
| G | Friction model parameter group | bbl/min/psi |
| i | Loop variable | |
| J | Jacobian matrix | |
| K | DRA model parameter | |
| K | Flow direction parameter | |
| k | Permeability | mD |
| $K_0, K_1$ | Bessel functions | |
| L | Length | ft |
| n | Number of moles | |
| N | Number of Stehfest weighing factors | |
| $N_{cells}$ | Number of cells | |
| $N^*_p$ | Number of perforations per foot | $ft^{-1}$ |
| Q | Volumetric flow rate | bbl/min |
| P | Pressure | psia |
| r | Radius | ft |
| Re | Reynolds number | |
| s | Laplace space variable | |
| S | Saturation | |
| S | Skin | |
| t | Time | min |
| tol | Tolerance | |
| TVD | True vertical depth | ft |
| Tw* | Shear wall stress at onset of drag reduction | |
| V | Stehfest weighing factors | |
| V | Volume | bbl |
| w* | DRA model parameter | |

TABLE 2

Greek symbols

| Symbol | Variable | Unit |
|---|---|---|
| Δ | Difference | |
| α | DRA model exponent | |
| $\alpha_1-\alpha_2$ | Inflow model parameter group | |
| δ | Drag reducer shift parameter | |
| ε | Roughness | in |
| φ | Porosity | |
| μ | Viscosity | cP |
| ρ | Density | lbs/gal |
| $\omega_{N-P}$ | Newton-Raphson successive over-relaxation parameter | |
| ξ | Wormhole skin model factor | |
| ψ | Wormhole frequency function | |

TABLE 3

Subscripts and Superscripts

| Symbol | Variable |
|---|---|
| a | Annulus |
| acid | Acid |
| coil | Coiled tubing |
| D | Dimensionless |
| DRA | Drag reducer |
| e | Effective |
| Filter cake | Filter cake |
| friction | Friction |
| H | Hydrostatic |
| i, j, k | Loop variables |
| l | Liner |
| max | Maximum |
| min | Minimum |
| p | Perforation |
| r | Reservoir |

TABLE 3-continued

Subscripts and Superscripts

| Symbol | Variable |
|---|---|
| s | Stimulation |
| t | Tubing |
| t | Total |
| w | Well bore |
| wf | Well flowing |
| wh | Wormhole |
| ~ | Laplace transformed variable |

As will be described in greater detail below, the model comprises discretization of the differential equations relating the flow and pressure values. The equations are based on the differential equations governing fluid flow.

Furthermore, on the assumption that the fluids are incompressible, conservation of volume is imposed at each cell, i.e. for each cell a condition for the net flow F into the cell is imposed, namely $F=Q_{in}-Q_{out}=0$.

The volume balance for all cells in the system is expressed as an array function F. To solve the equations requires finding the set of pressures such that all elements of F are zero:

$$F = \begin{vmatrix} F_l \\ F_a \end{vmatrix} = 0$$

More detailed expressions for the individual flows will be described in greater detail below. First, the overall simulation process will be described with reference to FIG. 4. The process may be performed by any suitably programmed processor, e.g. a computer.

After an initialisation step S1, the process loads the input parameters of the model in step S2. The input parameters may include:

Reservoir properties: Porosity, Water saturation, Permeability, Skin, Pressure, Temperature of surroundings, Matrix compressibility Fluid properties: Density, Viscosity, Compressibility, Heat capacity, Acid concentration Bore hole data: Size, Length, Trajectory Liner data: Size, Length, Roughness, Holes Tubing data: Size, Length, Casing shoe depth, Roughness, Bottom-hole gauge depth, Coiled tubing OD Heat transfer coefficient: Free convection, Forced convection Numerical: Maximum time step Options: Viscosity calculation, Permeability calculation Pump schedule: Rate, Fluid type, Drag reducer concentration, Coiled tubing position Wormhole model data: Linear to radial flow scaling Grid properties: Number of cells, Grid type, Initial fluid content.

Most of the input variables are directly measurable in a manner known in the art, the only exceptions being the permeability which may be estimated from correlations based on core flooding experiments, the heat transfer coefficients for free and forces convection, which may be estimated from chemical engineering standard text books, and the initial skin distribution, which may be estimated based on history matching of a number of historical stimulation jobs. The input parameters may be read from a file, or entered by a user via a suitable user interface, or in any other suitable way.

In step S3, the process validates the input data. If the input data are valid, the process continues at step S4; otherwise the process terminates.

In step S4, the flow equations are solved so as to determine the pressure values P that satisfy the above constraint F=0. As will be apparent below, these equations constitute a set of non-linear equations. They are solved iteratively by a multi-dimensional Newton-Raphson technique. It is understood, however, that other numerical methods known in the art may be used as well.

To this end, in step S4-1, the process selects/estimates an initial value $P^0$ of the solution vector.

Subsequently, the process, determines an improved estimate from:

$$P^{k+1} = P^k - (J^k)^{-1} F^k$$

where $J^k$ is the Jacobian matrix and k is the iteration index (i.e. in the first iteration, k=0). The above expression can be re-written as a linearised matrix equation, where the unknown vector is the difference between the current and the previous pressure vector:

$$J^k(P^{k+1} - P^k) = J_k \Delta P^{k+1} = -F^k \quad (1)$$

Hence, in each iteration, the process determines the current estimate of the flow matrix $F^k$ and the Jacobian matrix $J^k$. This involves an initial application of the so-called Stehfest algorithm in step S4-2, as will be described below. In step S4-3, the process calculates the k-th approximation of the flow matrix F and the Jacobian matrix J, which is given as $$J = \begin{vmatrix} \frac{\partial F_i}{\partial P_{l,j}} & \frac{\partial F_j}{\partial P_{l,i}} \\ \frac{\partial F_i}{\partial P_{a,j}} & \frac{\partial F_j}{\partial P_{a,i}} \end{vmatrix}$$

The derivatives are found analytically.

Figure 5:
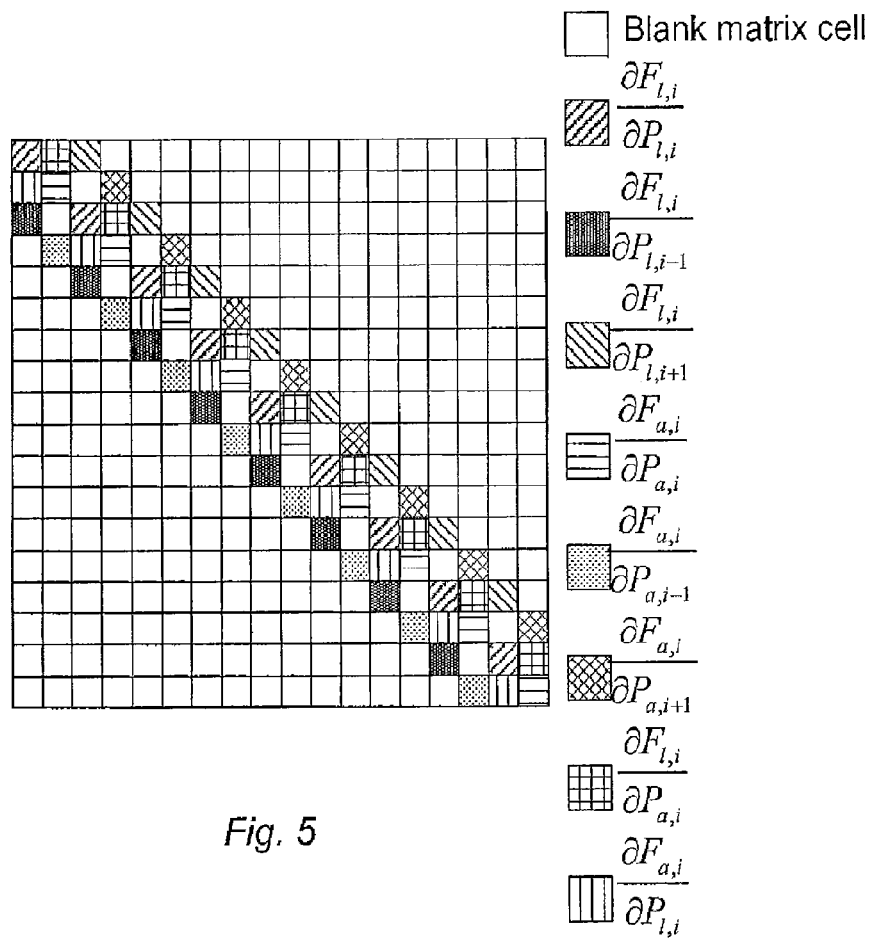
FIG. 5 shows the structure of a Jacobian matrix for the solution of the transport model described herein.

In step S4-4, the process solves the matrix equation (1). Since the problem is only two-dimensional (linear+radial), the bandwidth of the Jacobian matrix is very small, as is illustrated in FIG. 5. Gauss elimination may therefore be used as an attractive method, if it can be constructed to operate only on the non-zero elements. This may be achieved when the reservoir is discretized in the longitudinal direction only, thereby resulting in a matrix with small band-width. Such a method is denoted Sparse Gauss. It turns out that Gauss elimination performed solely on the non-zero elements involves only 6N calculations, where N is the number of cells in the system. The method involves two steps: The first step consists of transforming the band matrix to an upper triangular matrix which, in the second step, is solved using back-substitution.

From the solution of the above linear matrix equation, the updated pressure vector $P^{k+1}$ is determined. A net convergence speed-up is obtained by introduction of an under-relaxation parameter, $\omega_{N-R}$, in the pressure updating scheme:

$$P^{k+1} = P^k + \omega_{N-R} \Delta P^{k+1}$$

The solution vector is then updated until convergence has been achieved. It has been found that $\omega_{N-R}$=0.65 yields a good convergence rate; however other positive values less than or equal to 1 may be used as well. Final convergence rate is improved by omitting the under-relaxation.

In step S4-5, the process determines a stop criterion for the iteration. The scale-independent stop criterion for the multi-variable Newton-Raphson method is given as $$\frac{|P^{k+1} - P^k|}{2N_{cells,l}} < tol$$

where tol is a suitable tolerance threshold. When the above condition is fulfilled, the process continues at step S5; otherwise the process returns to step S4-3 for the next iteration.

In steps S5 and S6, the process determines the values of the pressure and the flow values for all volume cells at the solution of eqn. (1) obtained by the iteration.

In step S7, the process determines the next time step. To this end, the process receives as one of the inputs the initial fluid configuration, i.e. a list of fluids and which cells are initially filled by which fluid. In particular, since the simulated process involves the transport of a plurality of fluids through the system, the stimulation process may be viewed as a propagation of a number of interface areas or fluid front lines through the system, each interface defining the boundary between two fluids. It is thus useful to distinguish between the cell content and the cell saturation. The cell content indicates one of the plurality of fluids, e.g. mud, acid, brine, water, gas or oil. During fluid advance, a cell can contain more than one fluid, in particular when one type of fluid is replaced by another type of fluid during the advance of the fluids, i.e. when a front line passes through the particular cell. The cells where such a replacement occurs will be referred to as transition cells. For each time step, the transition cells may thus be defined as those accessible for the displacing/subsequent phase. The process maintains a list of transition cells so as to keep track of the locations of the front lines. In the present model, and at least for the liner cells, the cell content assigned to each cell is not changed until the cell has been entirely filled with a new fluid. On the other hand, the saturations are updated for each time step, which enables the simulator to keep track of all fluids, thereby honoring the volume balance of the system.

The process determines the length of the next time step as the minimum time required to fill any of the transition cells contained in the list of transition cells. Thus, $$\Delta t_i = \min\left\{ \frac{(1 - S_{j,k})V_j}{Q_{j,k}} \right\}$$

where i refers to the time step, j refers to the index of a transition cell and index k refers to the given fluid phase. $S_{j,k}$ is the saturation of phase k in cell j, V is the cell volume and $Q_{j,k}$ is the flow rate of phase k into cell j. In one embodiment, the phases inside a cell are simulated to all have the same flow rate. If there is no fluid motion (if the flow rates are zero), no cells will be filled. In that case, the minimum filling time is taken as 30 seconds, or some other user-specified value, to enable adequate prediction of the pressure fall-off response. In the time-span between two stimulations (when the stimulation vessel sails to shore to re-fill its tanks), the time step is arbitrarily increased to 30 minutes to speed up the simulation. Hence, the time step is generally determined by the model; it is not a user-controlled parameter. The time step is automatically controlled so as to avoid numerical dispersion of the different phases by ensuring that the fluid fronts do not pass more than one cell during each time step.

Once the size of the time step has been determined, the process updates the fluid saturations in the transition cells (i.e. the accessible cells) as follows (step S8):

$$S_{j,k} = S_{j,k} + Q_{j,k} \Delta t_i$$

where index k refers to the given fluid phase.

The described fluid advance model allows for motion of any number of fluid interfaces within each time step. The fluid configuration is updated by assigning a new fluid to the cell, which yields the smallest filling time.

As will be described in greater detail below, the stimulation fluid typically includes a drag reducing agent. In terms of fluid motion, the drag reducer acts as a tracer, because it is miscible in both acid and water. One way to update the drag reducer concentration in each cell is to set up a mass balance stating that what flows in minus what flows out equals the accumulation. Alternatively, the process tracks the position of each drag reducer front throughout the simulation, thereby avoiding a smearing of the fronts due to numerical dispersion.

Additional variables, which help to keep track of the fronts, include the fraction of a cell filled by the front and the cell corresponding to each front. An improved simulation of the transition of a front from the tubing into the liner may be achieved by simulating a flow connection between the first liner cell and the last tubing cell, e.g. by imposing a separate balance for each of the two cells. Inside the liner, fronts move more slowly than in the tubing, because fluid is lost to the annulus and subsequently to the formation. Since flow in the annulus will most likely be laminar, keeping track of the fronts in the annulus is less important. At the end of the liner, all fronts will eventually merge together because the liner rate is zero.

Embodiments of the simulation process further include a temperature model, decoupled from the volume balance. The temperature model is set-up so as to model convection and conduction as cold fluid is injected into the well. Average heat-transfer coefficients for free and forced convection provide adequate prediction of the temperature profile in the well as function of time. A good match of the measured bottom-hole temperature is obtained.

In step S9, a wormhole model is applied, as will be described in greater detail below, so as to estimate an effective bore-hole radius indicative of the efficiency of the creation of wormholes.

In step S10, the results of the calculation at the present time step are stored, e.g. on the hard disk of a computer, or any other suitable storage medium.

If further time steps are to be calculated, the process returns to step S4, otherwise, the process terminates after saving a complete set of simulation data (step S11).

Figure 6:
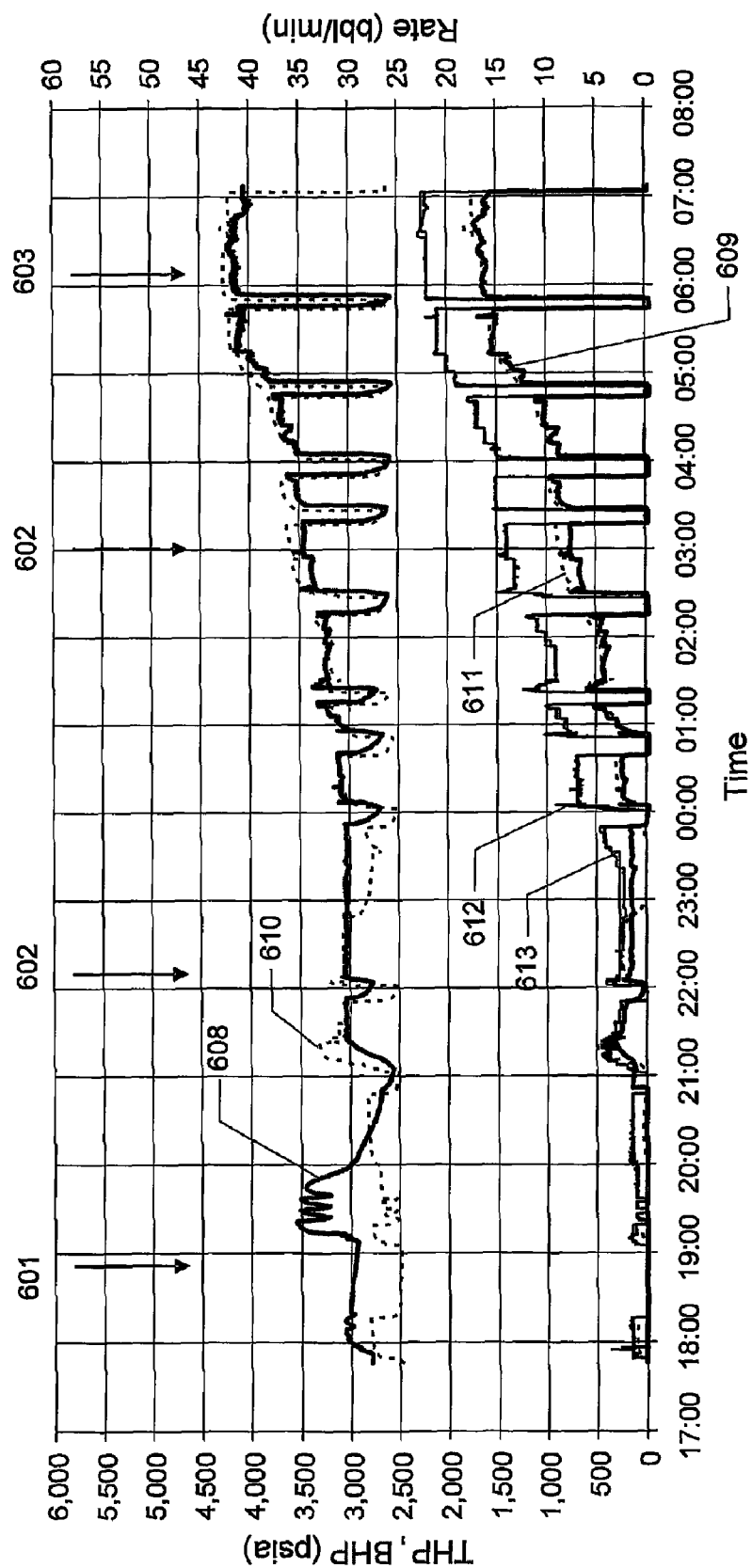
FIG. 6 shows an example result of a simulation as described herein.

Output from the process includes the pressure at a specified position in tubing and liner, the acid coverage along the well bore and the resulting effective well bore radius. Furthermore, any cell property at any time step can be retrieved from the output files, if required. An example of the simulation output compared to actual measurements is shown in FIG. 6. The graphs show the measured (solid lines 608, 609) and corresponding simulated pressure values (dotted lines 610, 611) lines at different locations (a top hole pressure THP, and a bottom hole pressure BHP), as well as measured (line 612) and simulated (line 613) flow rates. FIG. 6 further illustrates the occurrence of a number of events, namely the acid pre-spot through the coil (601), the acid reaches the formation (602), the acid reaches the end of the liner (603), the displacement with water (604).

Simulation results of the type illustrated in FIG. 6 may be used for history matching after a stimulation job is performed. When good matches between simulated and actual data are obtained the software can be used to optimise the design of new jobs. At a given time during the stimulation job the simulation software evaluates the optimum pumprate based on a realtime comparison of measured and simulated data. This may guide the stimulation operator to apply the optimum rates during the remainder of the stimulation job.

As mentioned above, the simulation process involves the calculation/modelling of the flow of acid and other fluids through the system, i.e. from the wellhead to the reservoir. In the following, an embodiment of the step S4-2 of calculating iteration values for the flow between cells will be described in greater detail. The embodiment is based on considerations of fluid dynamics, reaction kinetics, well test analysis and numerical analysis.

Friction and Drag Reduction:

During stimulation of oil or gas wells by an acid, drag reduction by dilute polymer solutions is typically used. Due to the high injection rates, in some cases exceeding 50 bbl/min, flow from the wellhead down through the 4½" or 5½" tubing is turbulent, except from the early part before acid reaches the uppermost perforations. For Newtonian fluids such as acid and water, frictional pressure is characterized by a friction factor, which in turn depends on the Reynolds number, well bore geometry, fluid properties and properties of potential chemical additives such as a drag reducing agent. The Reynolds number involves fluid viscosity, which is strongly temperature-dependent. Using oil field units, the Reynolds number is defined as $$Re = 15,916 \frac{\rho Q}{D\mu}$$

Where $\rho$ is the fluid density, Q is the flow-rate, D is the pipe diameter and $\mu$ is the fluid viscosity. The variables and their appropriate units used in the present description are summarised in tables 1-3. The flow-rate at any given position in the system is related to the local pressure drop using the Fanning equation. For pipe flow, using oil field units, one obtains that $$\Delta P_{friction} = -11.4015 \frac{Lf\rho Q|Q|}{D^5}$$

The majority of the pressure difference between the wellhead and the reservoir is caused by hydrostatic pressure. Since the tubing can contain various fluids, hydrostatic head is calculated on a cell-by-cell basis, starting from the top. The pressure difference due to the static head is given as $$\Delta P_H = 0.052 \rho \Delta TVD$$

The Fanning model for flow in rough pipes makes use of a friction factor, which depends on rate, fluid type and pipe geometry as follows:

$$\frac{1}{\sqrt{f}} = -4 \log_{10} \left[ \frac{1.26}{Re\sqrt{f}} + \frac{\varepsilon}{3.7D} \right] \quad (2)$$

In "Drag Reduction Fundamentals", by P. S. Virk, AIChE J. 21(4), 625-656 a model is suggested to predict the effect of drag reduction on the friction factor. Starting with the Prandtl-Karman (PK) model for turbulent flow in smooth pipes, $$\frac{1}{\sqrt{f}} = 4\log_{10}(Re\sqrt{f}) - 0.4$$

Virk (ibid.) proposed the following modification to the Fanning friction factor $$\frac{1}{\sqrt{f}} = (4+\delta)\log_{10}(Re\sqrt{f}) - 0.4 - \delta\log_{10}(\sqrt{2}Dw^*) \quad (3)$$

where D is the pipe diameter, δ is a slope increment and w* is an onset wave number. The onset wave number is defined as:

$$w^* = \frac{\sqrt{\frac{T_w^*}{\rho}}}{v_s}$$

where $T^*_w$ is the onset wall shear stress, ρ is the fluid density, and $v_s$ is the kinematic viscosity of the solvent.

Maximum drag reduction is achieved when the elastic sub-layer extends to occupy the entire pipe cross-section. Based on experimental evidence, Virk suggested representing the maximum drag reduction in terms of the following asymptote, which is independent of the type and amount of polymer used as drag reducer, $$\frac{1}{\sqrt{f}} = 19\log_{10}(Re\sqrt{f}) - 32.4 \quad (4)$$

Drag reduction by dilute polymer solutions in turbulent pipe flow is bounded between the two universal asymptotes described by the PK law for Newtonian turbulent flow and the maximum drag reduction asymptote. In between is the so-called polymeric regime in which the friction factor relations are approximately linear in PK coordinates ($1/\sqrt{f}$ versus $\log_{10} Re f^{0.5}$). The polymeric regime may be described by two parameters: The wall shear stress at the onset of the drag reduction, $T^*_w$, (or as an equivalent: the onset wave number, w*) and the slope increment, δ, by which the polymer solution slope exceeds Newtonian behavior. The onset of drag reduction occurs at a rather well defined onset wave number (or onset wall shear stress). For a given polymer solution w* is essentially the same for different well bore diameters. For solutions of a given polymer-solvent combination w* is approximately independent of polymer concentration. The slope increment has been found by analysis of experimental data to be related to the polymer concentration, $$\delta = KC_{DRA}^\alpha$$

where K and α are polymer/solvent specific parameters. In the presence of drag reducers the mean velocity profile in the Newtonian plug is shifted upwards from, but parallel to, the Newtonian law of the wall by an amount named the effective slip, as illustrated in FIG. 7.

Figure 7:
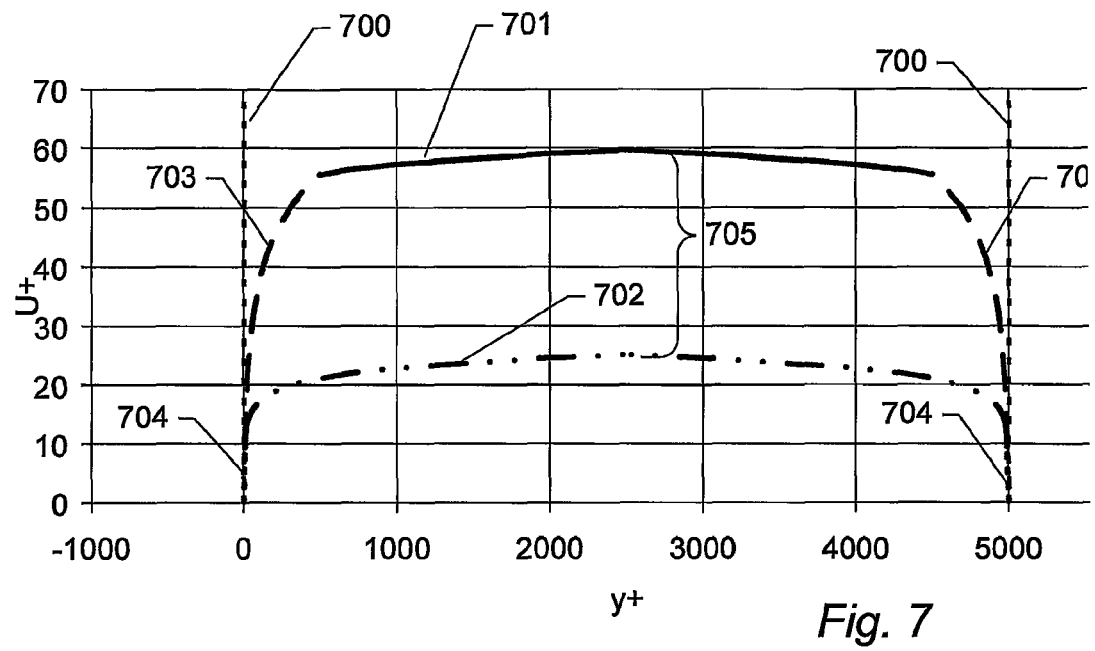
FIG. 7 illustrates the velocity profile in pipe flow.

FIG. 7 illustrates the velocity profile in pipe flow in terms of a normalised velocity U+ vs. a normalised distance y+ between pipe walls 700. Line 702 indicates the Newtonian wall law, line 704 the viscous sublayer, line 701 the Newtonian plug, and line 703 the elastic sublayer. The effective slip is indicated by reference numeral 705. The mean velocity profile in the elastic sub-layer 703 increases above the Newtonian wall layer 702 by the effective slip 705 across this sub-layer.

In "Drag Reduction in Rough Pipes" by P. S. Virk, J. Fluid Mech., vol. 45 (2), 225-246, (1971) the effect of drag reduction in rough pipes is investigated, but without disclosing a model to describe the measured pressure drop. Without the presence of DRA, the effect of pipe roughness is typically modelled with Eq. (2).

It has turned out that the effect of roughness can be incorporated into Eq. (3). The resulting combined expression thus describes the friction factor for the flow of Newtonian fluids in rough pipes in the presence of DRA:

$$\frac{1}{\sqrt{f}} = \\ -4\log_{10}\left[\frac{1.26}{Re\sqrt{f}} + \frac{\varepsilon}{3.7D}\right] - \delta\log_{10}\left[\frac{1}{Re\sqrt{f}}\right] - \delta\log_{10}\left[\sqrt{2}Dw^*\right] \quad (5)$$

Eq. (5) captures the gradually reduced effect of pipe roughness as DRA is added.

Figure 8:
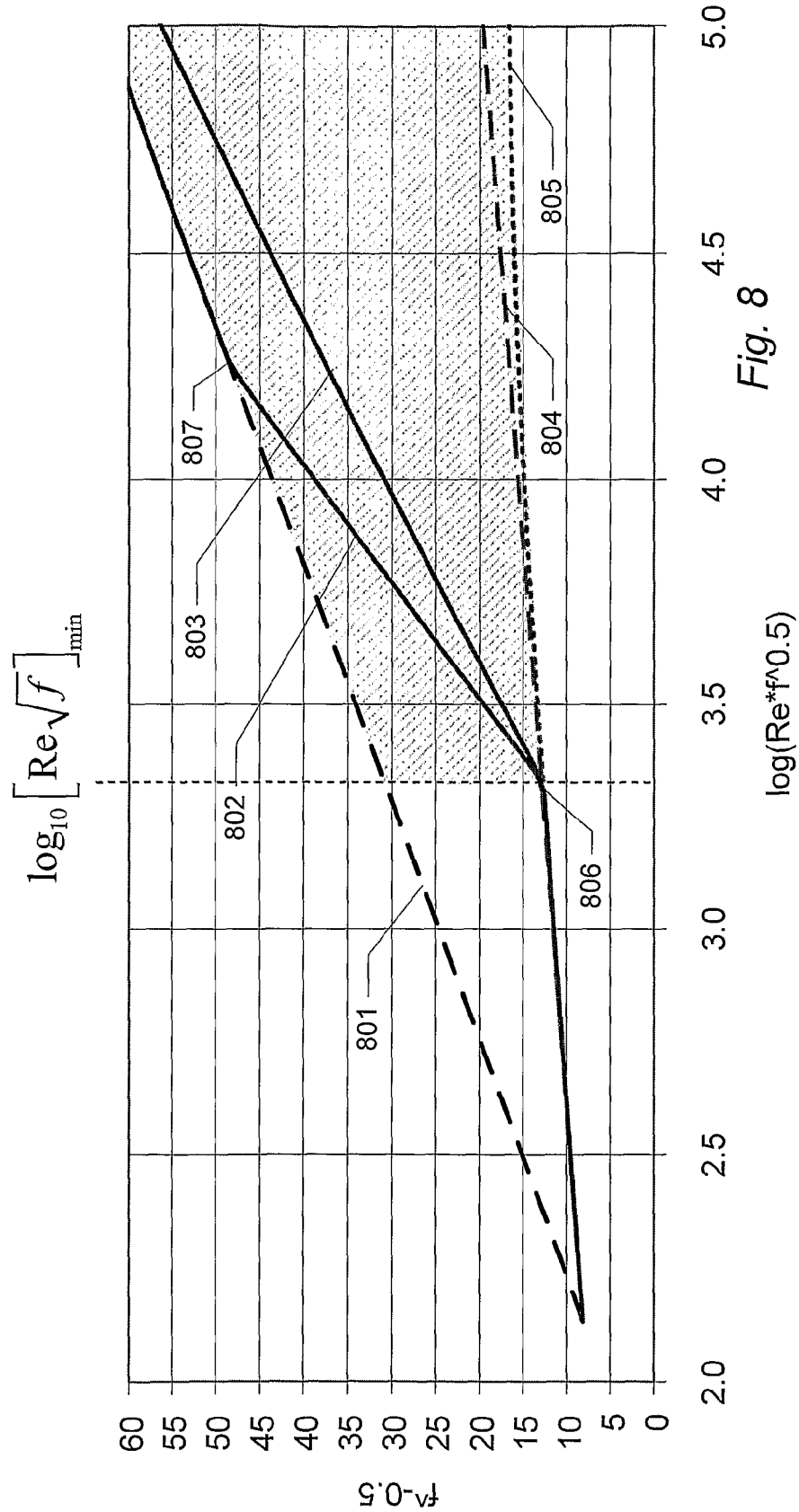
FIG. 8 schematically shows a PK diagram illustrating the effect on pipe roughness and drag reducing agents.

FIG. 8 schematically illustrates the corresponding PK diagram. Dashed line 801 corresponds to the maximum drag reduction, dotted line 805 corresponds to the PK line, dashed line 804 corresponds to the PK line without roughness, line 802 corresponds to the present model for a concentration of 10 ppt, while line 803 corresponds to the present model for a concentration of 2 ppt. The solution is constrained downwards by the PK law including roughness (line 804), described by Eq. (5), and upwards by the maximum drag reduction asymptote (line 801), expressed by Eq. (4). To apply the present model, one should ensure that the calculated friction factor belongs to the feasible region, i.e. the polymeric regime indicated as a shaded region in the PK diagram of FIG. 8. The intersection point between Eqs. (4) and (5) may be calculated by an iterative approach, whereby one obtains the maximum product of Reynolds number times the square root of the friction factor. Depending on the slope of the model (which in turns depends on the DRA concentration, as illustrated by lines 802 and 803), the model may or may not intersect the maximum drag reduction asymptote. Line 802 intersects the maximum drag reduction line at point 807, while line 803 does not reach the maximum drag reduction asymptote. Determination of the intersection between Eqs. (2) and (5) is simpler and requires no iteration:

$$[Re\sqrt{f}]_{min} = \sqrt{2}Dw^*$$

This point, indicated by reference numeral 806, marks the onset of drag reduction on the x-axis of the PK diagram for a given combination of DRA, solvent and pipe configuration (specified in terms of roughness and diameter).

Figure 9:
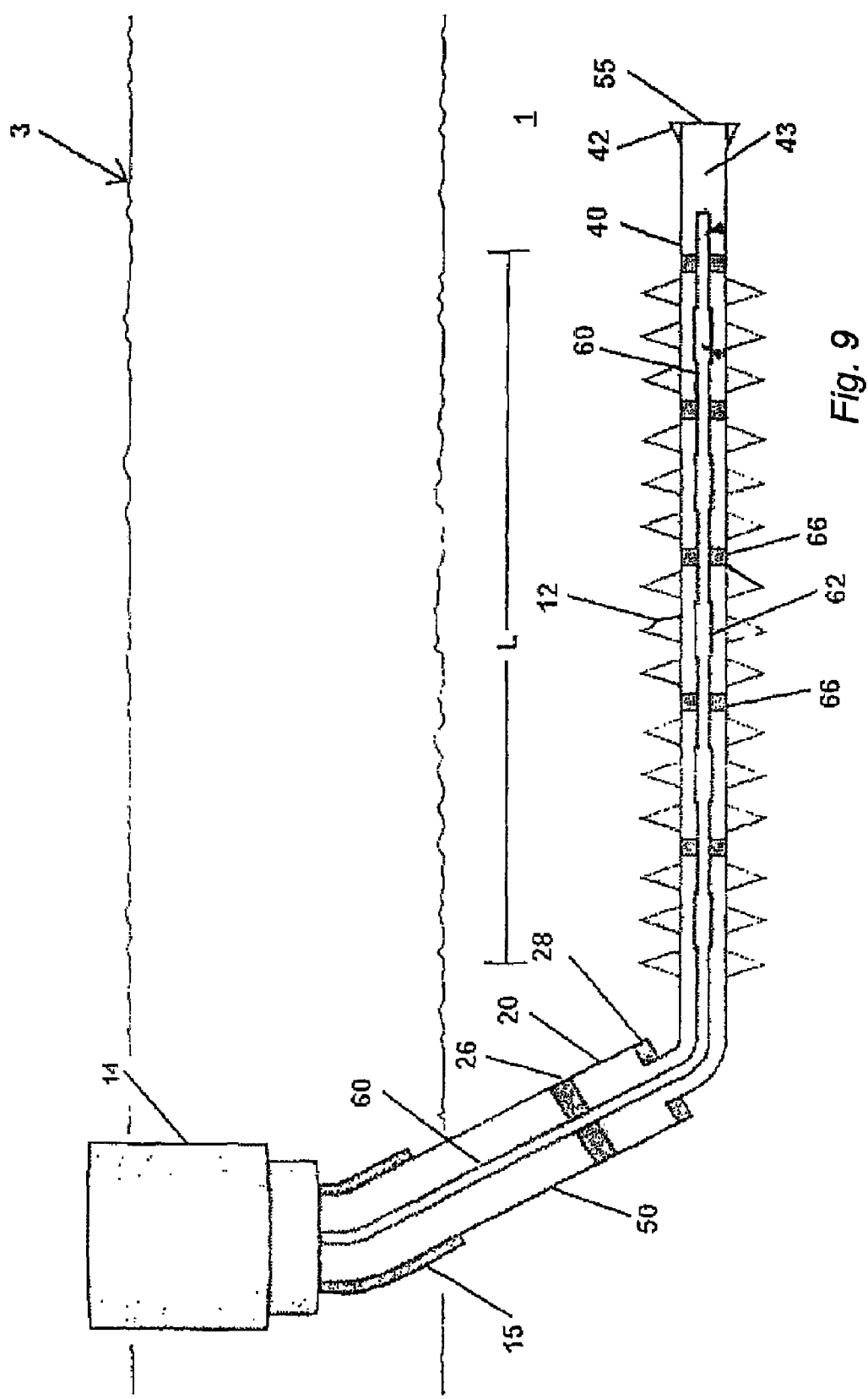
FIG. 9 schematically illustrates a horizontal well completed with the Perforate-Stimulate-isolate (PSI) technique.

It is noted that the friction model described herein is also applicable in other types of completion. FIG. 9 shows a well schematic for a horizontal well completed with the Perforate-Stimulate-Isolate (PSI) technique in the inner part as described in "A Unique Method for Perforating, Fracturing and Completing Horizontal Wells" by Damgaard, A., Bangert, D. S., Murray, D. J., Rubbo, R. P. and Stout, G. W. (1989), SPE 19282. In the outer part beyond coiled tubing reach (not shown) a CAJ liner may be used.

In the first portion of the well bore 50, near the surface or the seabed 3, a casing 15 is introduced that is subsequently provided with an enclosing cement shell that is cast in the space between the outside of the casing 15 and the wall of the well bore 50. The cement shell serves to brace the well bore.

In the subsequent portion of the well bore that is usually produced by use of a drill bit with another and smaller diameter, a subsequent casing 20 is introduced whose outer diameter corresponds approximately to said smaller diameter. Such next liner 20 extends from the surface 3 and to a depth of eg 4000 feet. Now cement is pumped down that forms a shell between the liner 20 on the one side and the wall of the well bore 50 and the casing 15, respectively, on the other side. The described procedure is repeated a number of times until the drill bit has reached the desired reservoir section. At this point in time, a so-called reservoir liner 40 is introduced, and cement is again pumped down to form a shell between the outside of the reservoir liner 40 and the wall of the well bore 50 in the reservoir 1. The reservoir liner 40 has a typical production length L of 8000 feet, over which length oil or gas is produced from the reservoir 1. The advancement as such of oil or gas from the reservoir 1 to the surface 3 is accomplished via a production tubing 60 that is conveyed down through the reservoir liner 40 and onwards to the end 55 of the well bore 50. Prior to introduction of the production tubing 60, the reservoir liner 40 and its enclosing cement shell must be perforated locally to create passages between the reservoir 1 and the production tubing 60. Also a so-called fracturing 12 is often performed, or a so-called acid-matrix treatment, of the formation 1 opposite the perforations formed in the reservoir liner 40 to increase the discharge of oil or gas from the reservoir 1. Usually, the production tubing 60 carries a number of external peripheral packers 66 and has openable gates or sliding sleeves 62 mounted in the wall of the production tubing 60.

A coiled tubing (not explicitly shown) runs inside the tubing to operate the sliding sleeves. When the coiled tubing is in hole during stimulation, the flow type becomes annular, which calls for a modification to Eq. (5). Assuming that the effective diameter in the tubing is simply given as $$D_e = (D_{i,t} - D_{coil})/2$$

Or, for annulus flow in the CAJ liner section, as $$D_e = (D_{i,a} - D_{o,l})/2$$

then Eq. (5) takes the following form:

$$\frac{1}{\sqrt{f}} = -4\log_{10}\left[\frac{1.26}{Re_a\sqrt{f}} + \frac{\varepsilon}{3.7D_e}\right] - \delta\log_{10}\left[\frac{1}{Re_a\sqrt{f}}\right] - \delta\log_{10}\left[\sqrt{2}\,D_e w^*\right] \quad (6)$$

Consequently, the combination of Eqs. (5) and (6) for pipe flow and annular flow, respectively, represents an extension of Virk's original model to predict the friction factor for any type of well-bore geometry and for any type of Newtonian fluid, such as acid and water and for any concentration and type of drag-reducing agent.

The friction calculation affects the fluids distribution along the liner and hence the acid coverage, i.e. the volume of acid per unit reservoir length. Failure to model the drag reduction sufficiently accurately may yield friction pressure errors of 500 psi at high injection rates. If the coiled tubing is present in the hole during stimulation, the friction pressures can become even higher. It is therefore important to estimate the maximum possible pumping rate achievable with a coiled tubing in hole to avoid having to pull it out of hole during the operation.

As described above, when fluid flows from the liner into the annulus, it passes through pre-drilled holes in the liner, which may cause a significant pressure drop, depending on the flow rate. Since a CAJ hole acts as an orifice, partial pressure loss recovery is accounted for in terms of a discharge coefficient (see e.g. J. B. and Conway, M. W. (1986): "Effects of perforation entry friction on bottom hole treating analysis", SPE 15474.1986). The value of this coefficient may be selected as a constant or it may be selected e.g. as a function of the drag reducer concentration in the adjacent liner cell (see e.g. Hansen, J. H. and Nederveen, N. (2002): Controlled Acid Jet Technique (CAJ) for Effective Single Operation Stimulation of 14,000+ ft Long Reservoir Sections, ibid.).

Reservoir Response:

Flow from the well bore into the reservoir is modelled by a transient inflow model. The inflow equation is the solution to the diffusivity equation combined with rate superpositioning to account for variable injection rates during the stimulation. Parameters entering the diffusivity equation include effective permeability, porosity, total compressibility, reservoir fluid viscosity and the rate history. The viscosity depends on the PVT behaviour of the reservoir fluid and can either be measured or estimated from correlations. Effective permeability depends on porosity and water saturation and can be estimated based on a petrophysical model developed for the specific reservoir layers penetrated by the well. It is assumed that the operation is carried out below fracture propagation pressure. The type of reservoir fluid is also important. If the fluid is a gas at reservoir conditions, the inflow model should incorporate pseudo-pressure rather than pressure and compressibility and viscosity become highly pressure-dependent.

The differential equation for fluid flow in porous media is the diffusivity equation, which is a combination of the law of conservation of matter, an equation of state, and Darcy's law (see e.g. Earlougher, R. C. (1977): "Advances in Well Test Analysis" SPE Monograph, ISBN 0-89520-204-2.). When expressed in radial coordinates, this equation becomes (in field units)

$$\frac{\partial^2 P}{\partial r^2} + \frac{1}{r}\frac{\partial P}{\partial r} = \frac{1}{0.0002637}\frac{\phi\mu c_t}{k}\frac{\partial P}{\partial t}$$

or, rewritten in dimensionless form, $$\frac{1}{r_D}\frac{\partial}{\partial r_D}\left(r_D \frac{\partial P_D}{\partial r_D}\right) = \frac{\partial P_D}{\partial t_D}$$

Solutions to the diffusivity equation are presented in terms of a dimensionless pressure function, $P_D$, which depends on dimensionless radius and time, defined as $$r_D = \frac{r}{r_w}$$

$$t_D = \frac{0.0002637 k t}{\phi \mu c_t r_w^2}$$

The time t is measured in hours. Assuming that calculations are based on the natural logarithm, the real pressure drop is related to the dimensionless pressure function as follows:

$$P_{wf} - P_r = \frac{141.2 B \mu Q}{kL} P_D$$

where Q is in bbl/day. Here, $\mu$ is the reservoir fluid viscosity, not the viscosity of the injected fluid.

Assuming that well bore effects have died out, the initial pressure response will be governed by radial flow. This period is known as transient or infinite-acting because the reservoir appears to be infinite since the boundaries have not been felt yet. Given the relatively short injection period combined with the low permeability of the formation, it is unlikely that pseudo-steady state is reached during the stimulation, which typically takes some 12 hours. The pressure pulse may, however, reach layers with different properties, e.g. saturations, permeabilities and porosities. For a single undamaged well in an infinite reservoir, the dimensionless pressure function takes the following form known as the line-source solution (see Theis, C.V. (1935): "The Relation between the Lowering of the Piezometric Surface and the Rate and Duration of Discharge of a Well Using Ground-Water Storage". Trans. AGU, 519-524):

$$p_D(t_D, r_D) = -\frac{1}{2} Ei\left(-\frac{r_D^2}{4t_D}\right) \cong \frac{1}{2}\left[\ln\left(\frac{t_D}{r_D^2}\right) + 0.80907\right]$$

where Ei is the exponential integral function, defined as $$Ei(x) = \int_x^\infty \frac{\exp(-x)}{x} dx.$$

The above equations apply for $t_D/r_D^2 > 25$ and for zero skin. For very early times, or for negative skins, the Theis solution based on the exponential integral is not applicable and a numerical solution method is used to solve the diffusivity equation. The approach taken here is to perform deconvolution of the Laplace space solution, using Stehfest's algorithm. The Laplace transformed dimensionless pressure function including storage and skin is given in as (see Raghavan, R. (1993). Well Test Analysis. Prentice Hall, Englewood Cliffs, N.J.):

$$\tilde{P}_D(s) = \frac{K_0(r_D\sqrt{s}) + S\sqrt{s} K_1(\sqrt{s})}{s[\sqrt{s} K_1(\sqrt{s}) + C_D s[K_0(r_D\sqrt{s}) + S\sqrt{s} K_1(\sqrt{s})]]} \quad (7)$$

Eq. (7) is also known as the finite well-bore radius solution. Note that dimensionless time is transformed to the variable s in Laplace space. This variable must not be confused with the skin, S. $K_0$ is the modified Bessel function of the second kind of zero order and $K_1$ is the modified Bessel function of the second kind of first order. Both Bessel functions are defined in standard mathematical text books. Inversion of Eq. (7) can be performed very efficiently using the Stehfest algorithm described below (see Stehfest, H. (1970). Numerical Inversion of Laplace Transforms. Comm. ACM 13 (1), 47-49):

$$P_D(t_D) = \frac{\ln 2}{t_D} \sum_{i=1}^{N} V_i \tilde{P}_D\left[\frac{\ln 2}{t_D} i\right]$$

This equation applies for a dimensionless radius of 1.0. The weighing factors, $V_i$, are given as $$V_i = (-1)^{N/2+i} \sum_{k=(i+1)/2}^{\min(i,N/2)} \frac{k^{N/2}(2k)!}{(N/2-k)!k!(k-1)!(i-k)!(2k-i)!}$$

In one embodiment, the number of weighing factors is set to 12, and their values are set as follows: $V_1=-0.017$, $V_2=16.017$, $V_3=-1247.0$, $V_4=27554.3$, $V_5=-263280.8$, $V_6=1324138.7$, $V_7=-3891705.5$, $V_8=7053286.3$, $V_9=-8005336.5$, $V_{10}=5552830.5$, $V_{11}=-2155507.2$, $V_{12}=359251.2$.

In one embodiment, a polynomial approximation is used instead of an evaluation of the dimensionless pressure function using the Stehfest algorithm for each liner cell at each time step, thereby reducing the required computational resources. The tabulated function values are approximated by the following polynomial:

$$P_D(t_D) = e^{-9.42 \cdot 10^{-4} (\ln t_D)^3 - 0.019187 (\ln t_D)^2 + 0.365753 \ln t_D - 0.219268} \quad (8)$$

A further advantage of the above approximation is that it is applicable at dimensionless times below $10^{-3}$, where the Stehfest algorithm breaks down due to numerical instabilities of the Bessel function approximations. To improve the calculation speed during the simulation, determination of the dimensionless pressure function is performed using binary search in a lookup table created using the polynomial approximation.

Figure 10:
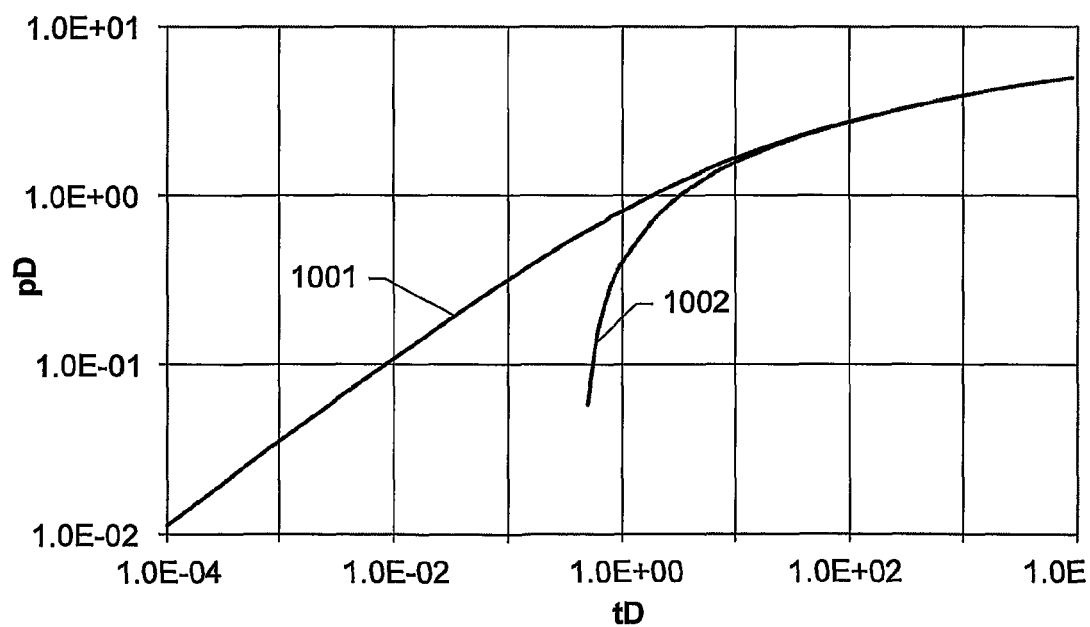
FIG. 10 compares a traditional approximated solution to the $P_D$ function to the solution obtained using the Stehfest algorithm.

FIG. 10 illustrates the Ei-solution (line 1002) and how it deviates from the finite well-bore radius solution (line 1001) at early times. Eq. (8) is seen to provide a good approximation to the solution.

Formation Damage and Wormholing:

During the drilling process, a filter cake develops on the interface between the chalk face and the borehole to prevent loss of mud into the reservoir. This filter cake, or mud cake, is typically a few mm thick and causes an additional pressure drop, denoted a skin, both during stimulation and during the subsequent production unless it is properly removed. The primary goal of acid stimulation is to improve the transfer of fluids between the well bore and the reservoir by reducing the skin. Even though the mud cake is typically acid insoluble since it consists primarily of barite (barium sulphate) and bentonite (active clay), the mechanical impact of acid jetted through the holes means that acid removes the mud cake and reacts with the chalk after a certain time.

The net effect of the chalk/acid chemical reaction is to reduce the skin, but skin reduction cannot simply be related to the amount of acid injected. Experimental evidence suggests that the penetration depth of the acid, i.e. the distance reached by the acid before it is spent, is dependent on a dimensionless quantity termed the Damköhler number, which is controlled mainly by the injection rate entering the formation. Experiments on linear core plugs indicate that an optimum Damköhler number exists, promoting growth of acid fingers or wormholes, which are high-conductivity pathways/flow channels.

Immediately after mechanical breakdown of the mud cake by the acid, the skin becomes zero, i.e. the effective well bore radius equals the actual well bore radius. Unless the pressure exceeds the fracture propagation pressure, further skin reduction is now caused by chemical reaction between the acid and the chalk. The reaction itself is very fast and is therefore not the rate-limiting step. As the acid reacts with the chalk, the surface area available for further chemical reaction increases. It is important to realize that the shape of the volume of chalk removed by acid will not necessarily be cylindrical. Depending on a number of conditions, the acid may create channels in the matrix, denoted wormholing. Creation of wormholes is clearly more beneficial than merely dissolving the chalk near the well bore, referred to as face dissolution, and the stimulation design aims at enhancing the penetration of the wormholes to maximize the effective well bore radius based on the available acid volume. Therefore, an accurate modelling of the wormhole creation as a part of the simulation process ensures reliable simulation results in terms of an optimisation of the process parameters so as to provide an efficient generation of wormholes.

Figure 11:
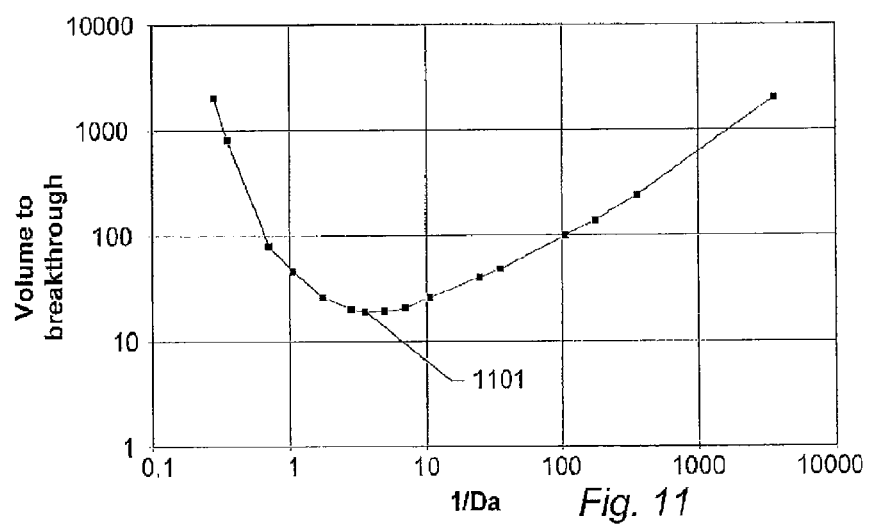
FIG. 11 shows the acid volume required to breakthrough versus the inverse Damköhler number for a laboratory series of core plug experiments.

From experimental evidence using linear flow in core plugs, Fredd et al. (1997, ibid.) reported a relation between the acid volume required to achieve breakthrough and the Damköhler number. FIG. 11 shows the acid volume required to obtain breakthrough versus the inverse Damköhler number. As can be seen from FIG. 11, an optimum injection rate exists corresponding to an optimal Damköhler number 1101 of around 0.29, which minimizes the volume of acid required to achieve a given penetration. The Damköhler number can be estimated as $$Da = \frac{a \cdot D_{eff}^{2/3} \cdot L_{wh}}{Q_{wh}}$$

where $D_{eff}$ is the effective diffusion coefficient, which is inversely proportional to the acid viscosity. For strong acids such as hydrochloric acid, the chemical reaction is fast and the process is therefore mass-transfer limited. The flow rate into each wormhole depends on the total flow rate into the formation per unit length and the number of active wormholes per unit length, $$Q_{wh} = \frac{Q_s}{L \psi_{wh}}$$

The wormhole frequency function can be related to the surface area and the current wormhole length. It has turned out that the following semi-empirical relationship provides good results:

$$\psi_{wh} = \frac{A}{LL_{wh}} \tag{9}$$

The number of moles of acid injected into each wormhole during time-step j is $$n_{acid} = Q_{wh} C_{acid} \Delta t_j$$

where the acid concentration is converted from the usual weight % to M. From the core flood experiments by Fredd et al. (1997, ibid.), the incremental wormhole length per mole of acid (a derivative) can be calculated as a function of the Damköhler number, since the measurements of acid volumes to breakthrough can be converted to moles of acid:

$$\frac{dL_{wh}}{dn_{acid}} = \frac{L_{core}}{V_{acid} \cdot C_{acid}} \tag{10}$$

Since flow into the formation is radial, as opposed to linear flow in a core plug, the derivative is scaled by a factor F to account for the fact that branching of the wormholes will be more pronounced in radial flow compared to linear flow. The value of F may depend on the type of formation. In one example F is set to 0.05. Thus, $$\Delta L_{wh} = F \cdot n_{acid} \frac{dL_{wh}}{dn_{acid}}(Da) \tag{11}$$

There is no analytical formula, so the derivative is found by interpolation in a table containing discrete values calculated using Eq. (10) for a range of Damköhler numbers. Based on the new wormhole length and the wormhole frequency, the corresponding effective well bore radius is estimated as follows:

$$r_{we} = r_w + L_{wh}[1 - e^{-\zeta \cdot \psi_{wh}}] \tag{12}$$

Eq. (12) represents an empiric approach to relate the effective well bore radius to the length and frequency of wormholes; it varies between the true well bore radius when no wormholes are present up to the true well bore radius+the wormhole length, which represents the case where numerous long wormholes exist. The empirical constant $\zeta$ in the exponent has been found to have limited effect on the results and can be set to a suitable number, e.g. 1.

The resulting skin is then calculated as $$S = \ln \frac{r_w}{r_{we}}$$

Thus, interesting aspects of the wormhole model described herein include the proposed wormhole density function, Eq. (9), the scaling of the linear core flooding results to a radial flow geometry, Eq. (11), and the link between wormhole properties and the effective well bore radius, Eq. (12).

Set-Up of the Numerical Model

As described above, the simulation process utilizes a finite-difference model by discretizing the non-linear equations describing fluid flow in space. In the following the discrete flow equations will be described in greater detail with reference to FIG. 3.

Flow between liner cells 70 is affected by friction pressure and hydrostatic head, $$Q_{L,i} = K_{L,i} \sqrt{\frac{2D_{L,i}^5}{4.582 \cdot 10^{-5}(L_i + L_{i+1})f_{L,i}\rho_{L,i}}} \sqrt{K_{L,i}(P_{L,i} - P_{L,i+1} + P_{H,i+1} - P_{H,i})}$$

Similarly, flow between annulus cells 57 is given as $$Q_{a,i} = K_{a,i} \sqrt{\frac{2(D_{3,i}^2 - D_{2,i}^2)^{2.5}}{4.582 \cdot 10^{-5}(L_i + L_{i+1})f_{a,i}\rho_{a,i}}} \sqrt{K_{a,i}(P_{a,i} - P_{a,i+1} + P_{H,i+1} - P_{H,i})}$$

Flow through perforations 72, i.e. between liner cells 70 and annulus cells 57 becomes $$Q_{p,i} = K_{p,i} \frac{D_{p,i}^2 C_d (L_i + L_{i+1}) N_{p,i}^*}{2\sqrt{0.2369 \rho_{a,i}}} \sqrt{K_{p,i}(P_{l,i} - P_{a,i})}$$

Parameters $K_{l,i}$, $K_{a,i}$ and $K_{p,i}$ are introduced for numerical reasons to avoid having negative arguments to the square-root function.

It is a complicating factor for the solution strategy that the flow direction is each cell is not known a priori.

$$K_{l,i} = \begin{cases} 1, & \text{for } P_{l,i} - P_{l,i+1} + P_{H,i+1} - P_{H,i} > 0 \\ -1, & \text{for } P_{l,i} - P_{l,i+1} + P_{H,i+1} - P_{H,i} \leq 0 \end{cases}$$

$$K_{a,i} = \begin{cases} 1, & \text{for } P_{a,i} - P_{a,i+1} + P_{H,i+1} - P_{H,i} > 0 \\ -1, & \text{for } P_{a,i} - P_{a,i+1} + P_{H,i+1} - P_{H,i} \leq 0 \end{cases}$$

$$K_{p,i} = \begin{cases} 1, & \text{for } P_{l,i} - P_{a,i} > 0 \\ -1, & \text{for } P_{l,i} - P_{a,i} \leq 0 \end{cases}$$

For computational efficiency, the following parameter grouping is introduced:

$$G_{l,i} = \sqrt{\frac{2 D_{1,i}^5}{4.582 \cdot 10^{-5} (L_i + L_{i+1}) f_{l,i} \rho_{l,i}}}$$

$$G_{a,i} = \sqrt{\frac{2 (D_{3,i}^2 - D_{2,i}^2)^{2.5}}{4.582 \cdot 10^{-5} (L_i + L_{i+1}) f_{a,i} \rho_{a,i}}}$$

$$G_{p,i} = \frac{D_{p,i}^2 C_d (L_i + L_{i+1}) N_{p,i}^*}{2\sqrt{0.2369 \rho_{a,i}}}$$

Flow rates in liner and annulus cells are therefore expressed as:

$$Q_{l,i} = K_{l,i} G_{l,i} \sqrt{K_{l,i}(P_{l,i} - P_{l,i+1} + P_{H,i+1} - P_{H,i})}$$

$$Q_{a,i} = K_{a,i} G_{a,i} \sqrt{K_{a,i}(P_{a,i} - P_{a,i+1} + P_{H,i+1} - P_{H,i})}$$

$$Q_{p,i} = K_{p,i} G_{p,i} \sqrt{K_{p,i}(P_{l,i} - P_{a,i})}.$$

Flow into the formation is found by re-arranging the variable-rate expression and introducing a pressure drop over the filter cake, $$Q_{s,i} = \frac{K_{s,i}(P_{a,i} - P_{r,i} - \Delta P_{filter\,cake}) - \alpha_{1,i}}{\alpha_{2,i}}$$

$$K_{s,i} = \begin{cases} 1, & \text{for } P_{a,i} - P_{r,i} - \Delta P_{filter\,cake,i} > 0 \\ 0, & \text{for } P_{a,i} - P_{r,i} - \Delta P_{filter\,cake,i} \leq 0 \end{cases}$$

Once acid has broken through to the formation, the filter cake disappears for the given cell.

$$\alpha_{1,i} = \frac{1440 \cdot 141.2 B \mu_{a,i}}{k_i L_i} \left( \sum_{j=1}^{N-1} (Q_j - Q_{j-1}) p_D[(t_N - t_{j-1})_D] - Q_{N-1} p_D[(t_N - t_{N-1})_D] \right) \quad (13)$$

$$\alpha_{2,1} = \begin{cases} \dfrac{1440 \cdot 141.2 B \mu_{a,i}}{k_i L_i}(p_D[(t_N - t_{N-1})_D] + S), & S > 0 \\ \dfrac{1440 \cdot 141.2 B \mu_i}{k_i L_i}(p_D[(t_N - t_{N-1})_{eD}]), & S < 0 \end{cases}$$

The factor 1440 is introduced because pump rates are given in bbl/min rather than bbl/d.

As described above, the volume balance for each cell in the system is expressed as an array function F. To solve the equations requires finding the set of pressures such that all elements of F are zero:

$$F = \begin{vmatrix} F_l \\ F_a \end{vmatrix} = 0$$

For the purpose of the present description, the negative mixing volume arising from mixing of acid and water is neglected. The imposed pump rate enters the flow equations in terms of a boundary condition for the first liner cell. For the CAJ liner cells (70) and the open-hole cells (55), $$\begin{aligned} F_{l,i} &= Q_{l,i} - Q_{l,i-1} + Q_{p,i} \\ &= K_{l,i} G_{l,i} \sqrt{K_{l,i}(P_{l,i} - P_{l,i+1} + P_{H,i+1} - P_{H,i})} - \\ &\quad K_{l,i-1} G_{l,i-1} \sqrt{K_{l,i-1}(P_{l,i-1} - P_{l,i} + P_{H,i} - P_{H,i-1})} + \\ &\quad K_{p,i} G_{p,i} \sqrt{K_{p,i}(P_{l,i} - P_{a,i})} \end{aligned}$$

The CAJ liner is closed at the end. Therefore, there is no direct fluid flow between the CAJ liner and the open-hole section. A similar boundary condition applies for the last cell in the open-hole section, where the flow rate is also zero.

For the annulus cells (57), $$\begin{aligned} F_{a,i} &= Q_{a,i} - Q_{a,i-1} + Q_{s,i} - Q_{p,i} \\ &= K_{a,i} G_{a,i} \sqrt{K_{a,i}(P_{a,i} - P_{a,i+1} + P_{H,i+1} - P_{H,i})} - \\ &\quad K_{a,i-1} G_{a,i-1} \sqrt{K_{a,i-i}(P_{a,i-1} - P_{a,i} + P_{H,i} - P_{H,i-1})} + \\ &\quad \frac{K_{s,i}(P_{a,i} - P_{r,i} - \Delta P_{filter\,cake,i} - \alpha_{1,i})}{\alpha_{2,i}} - \\ &\quad K_{p,i} G_{p,i} \sqrt{K_{p,i}(P_{l,i} - P_{a,i})} \end{aligned}$$

The annulus flow rate is zero at the beginning and at the end of the annulus.

The combination of equations for fluid transport, reaction kinetics, and pressure transient analysis gives rise to a system of non-linear equations, which must be solved a large number of times. Regardless of the continuous improvement of modern computer speed, the solution strategy for obtaining the pressure distribution for this particular set of equations remains a computationally resource-demanding task, in particular in connection with applications of the process for real-time optimization of the stimulation process.

Figure 4:
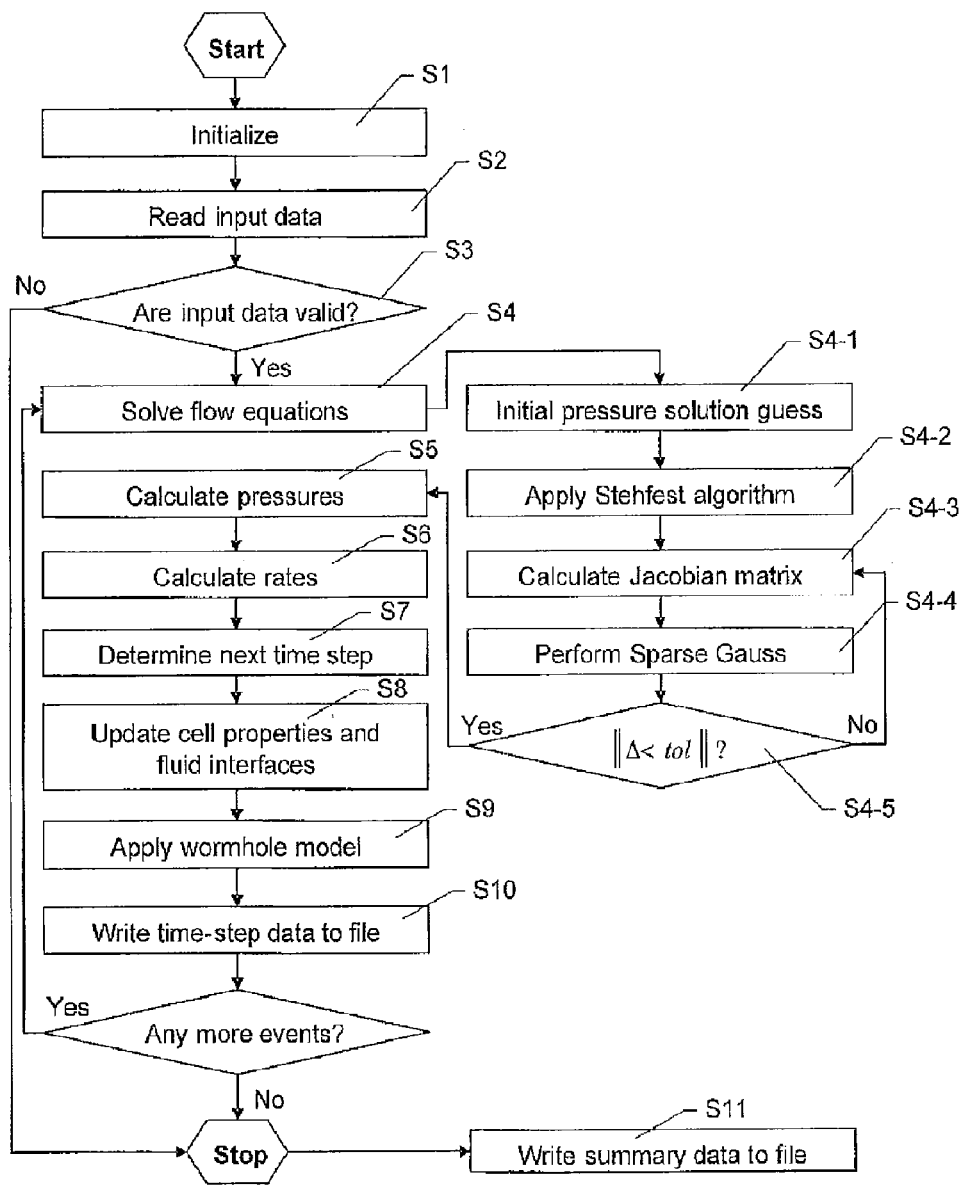
FIG. 4 shows a flow diagram of the simulation process.

As described herein, the above non-linear equations are efficiently solved iteratively by a multidimensional Newton-Raphson technique, as described in connection with FIG. 4.

Other major computational speed-ups are related to the execution of Eq. (13) where the number of summation steps can be reduced by rate averaging the periods with constant pump rate without sacrificing the accuracy.

Hence, in the above, a numerical solution strategy is described for an improved construction and analysis of the transient aspects during acid stimulation of long horizontal wells completed in a carbonate reservoir with a CAJ liner. According to different aspects and embodiments, a combined flow modelling in the liner and annulus of a stimulation system are described as well as an advanced fluid friction model that accounts for changing well-bore geometry and the presence of drag-reducing agents, and a simulation method that accounts for the creation and development of wormholes caused by chemical reaction between the reservoir rock and the stimulation fluid.

It is an advantage of embodiments of the methods described herein that they provide a high computational speed thus enabling onsite simulation of adjusted pumping schedules, also known as real-time optimization to improve the stimulation efficiency.

The process described herein may be applied prior to a given stimulation of a well. Based on measured saturations and porosities, the permeability variation of the reservoir is estimated from layer-specific correlations. After the reservoir section has been drilled, formation pressures are recorded. From experience, the acid coverage should not be lower than 1.0 bbl/ft, which implies that the stimulation vessel often will have to perform the stimulation in two runs due to long reservoir sections. Based on the recorded information and knowing the well-bore geometry, it is then possible to estimate the maximum pumping rate that can be achieved without fracturing the formation. Unintentional fracturing can have devastating effects on well economics. Operational experience also suggests that the initial skin is between +5 and +10. It is assumed that the skin is distributed evenly across the length of the well even though the formation damage will be governed locally by the degree of overbalance and the condition of the mud at the time of drilling. For simulation purposes, this makes no difference, because the acid is jetted through the mud cake, resulting in mechanical break-down. With all this information, the model then calculates a distribution of holes in the liner that ensures that the acid reaches the end of the liner and that all areas receive adequate acid coverage. This may be done as a trial and error analysis by applying the transient model to different candidate hole distributions, optionally supplemented by a conventional steady-state model, which aims for a certain specified uniform acid coverage along the well. A uniform coverage is difficult to achieve in practice due to variations in reservoir properties. From the calculated hole distribution and specified liner joint lengths the software also generates a running tally, which describes how many holes should be drilled in each liner joint as this operation takes place on the rig location and on-the-fly.

During the stimulation, information such as pressure, temperature, fluid rates, fluid density, fluid type, drag reducer concentration etc. are recorded. The rate is gradually ramped up in pre-determined steps as the mud cake is broken down. Between each rate step, the pumps are shut down (zero rate) and the resulting pressure response, denoted a fall-off, is observed. Fall-off data give clues about the reservoir properties such as skin and permeability.

After the stimulation has been performed, the recorded well-head and bottom-hole pressures (and temperatures) are compared to the model predictions. Some history matching may be required and typically involves adjustment of the initial skin to match the initial pressure level and in some cases the permeability needed to match the fall-off pressure data. The matching parameters are then stored in a dedicated database. Inspection of the database contents indicate that some general trends can be inferred such as the initial skin, a typical average permeability and so on. This knowledge is then applied for the next stimulation job.

A further application of the software relates to onsite real-time optimization of the stimulation job where the intent is to continuously adjust the pump rate, the acid concentration, or the amount of drag-reducing agent, to make more efficient use of the acid. The acid pump rate required to achieve maximum efficiency of the pumped acid changes with time due to the change in length and number of active worm holes. Additionally, if for instance the measured bottom-hole pressures start to deviate significantly from the modelled data, the model can be re-run to match the actual pressure response and a new, slightly altered injection strategy can be devised.

The overall advantages of using the process described herein include that the reservoir parameter envelope defining the applicability of CAJ liners can be extended. CAJ liners may thus be deployed in longer wells with higher lateral pressure variations than before, resulting in substantial cost savings and enhanced productivity. Additionally, the amount of drag-reducing agent may be lowered, e.g. from 5 to 1-2‰, resulting in vast chemical cost savings. Furthermore, optimising the pump rate, and avoiding too high pump rates result in an increased productivity of the well.

Although some embodiments have been described and shown in detail, the invention is not restricted to them, but may also be embodied in other ways within the scope of the subject matter defined in the following claims.

In particular, the invention has mainly been described in connection with reference to the CAJ liner approach and the stimulation of oil or gas wells. However, it will be appreciated that the methods described herein may also be applied to other stimulation approaches, e.g. the PSI approach, as well as other systems involving material flow through conduits and/or material formation, e.g. in connection with the stimulation/exploitation of other carbonate reservoirs, or the like The method, product means, and device described herein can be implemented by means of hardware comprising several distinct elements, and by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method of simulating fluid transport in a system for enhancing productivity of a well in a material formation of a resource reservoir, the system comprising a conduit element arranged in said well, the conduit element comprising a conduit wall including one or more openings for discharging a fluid into the material formation surrounding the conduit element; the method comprising establishing and numerically processing a transport model of fluid transport inside the conduit element;

wherein the method comprises establishing a transport model of longitudinal fluid transport along a longitudinal axis of the conduit and of lateral fluid transport away from said longitudinal axis into the material formation, wherein the transport model includes a grid of volume cells;

characterized in that the transport model further includes a model of fluid transport in a predetermined annulus space around said conduit element between the conduit element and the formation for modeling displacement of mud by acid; and that the grid of volume cells includes cells of a number of different cell types including a first type of cells representing the conduit element and a second type of cells representing the annulus space around said conduit element, and wherein the transport model includes respective, local models for modeling fluid flow between adjacent volume cells.

2. The method according to claim 1, wherein the cells of the first type are arranged in a first linear sequence, each cell of the first type representing a section of said conduit element; and wherein the cells of the second type are arranged in a second linear sequence, each cell of the second type being located adjacent to a corresponding cell of the first type.

3. The method according to claim 1, wherein the grid of volume cells further includes a third type of cells representing the material formation.

4. The method according to claim 1, wherein the size of the cells varies along the conduit element.

5. The method according to claim 4, wherein the cells at locations of the openings are smaller than the cells at the locations between said openings.

6. The method according to claim 1, wherein the transport model includes a model of a pressure drop between adjacent cells in the grid of volume cells, wherein the model of the pressure drop is adapted to model the pressure drop as a function of at least a friction factor indicative of a friction drag incurred during transport of said fluid in the conduit; and wherein the method comprises estimating the friction factor from a friction model relating the friction factor to at least a roughness parameter indicative of a roughness of said wall.

7. The method according to claim 6, wherein the friction model further relates the friction factor to a parameter indicative of a property of the drag reducing agent.

8. The method according to claim 7, further comprising calculating an effective conduit radius dependent on at least one parameter indicative of an estimated distribution of flow channels generated in the formation by a dissolution process of at least a part of the material of the material formation surrounding the conduit.

9. The method according to claim 1, wherein the fluid comprises a solvent, such as water or an acid, and a drag reducing agent.

10. The method according to claim 1, wherein the fluid transport is a fluid transport in a CAJ liner.

11. The method according to claim 1, wherein the simulating is performed in discrete time steps, each time step having a time step length; and wherein the method comprises determining the time step length of a subsequent time step based on a simulation result of a preceding time step.

12. The method according to claim 11, wherein determining the time step length includes determining the time step length from a calculated minimum time required to fill any of a number of transition cells, each transition cell Including a first fluid and being at least partially filled with a second fluid replacing the first fluid during the subsequent time step.

13. The A-method according to claim 1, further comprising solving a flow equation by means of a Newton-Raphson method with an under-relaxation parameter.

14. A method of stimulating a well by means of a well stimulation system for performing a stimulation process, the method comprising;
performing a simulation by performing the steps of claim 1;
selecting at least a construction parameter of the well stimulation system or a process parameter of the stimulation process based on a result of the stimulation; and
performing the stimulation process with the selected construction parameter of process parameter.

15. The method according to claim 14, wherein the system for stimulating a well comprises a conduit element arranged in said well, the conduit element comprising a conduit wall including one or more openings for discharging a fluid into a material formation surrounding the conduit element; and wherein the construction parameter is a distribution of said openings along the conduit.

16. The method according to claim 14, wherein the stimulation process comprises pumping a fluid through a conduit into the well according to a pump schedule; and wherein the process parameter is the pump schedule.

17. A computer program product comprising program code means adapted to cause a data processing system to perform the steps of the method according to claim 1, when said program code means are executed on the data processing system.

18. A computer-readable medium having stored thereon program code means adapted to cause a data processing system to perform the steps of the method according to claim 1, when said program code means are executed on the data processing system.

19. A data processing system configured to perform the steps of the method according to claim 1.

20. A method of simulating fluid transport through a conduit surrounded by a wall, the fluid including a drag reducing agent; the method comprising;
establishing a transport model including a model of a pressure drop along said conduit, the model of the pressure drop being adapted to model the pressure drop as a function of at least a friction factor indicative of a friction drag incurred during transport of said fluid in the conduit; and
estimating the friction factor from a friction model relating the friction factor to at least a roughness parameter indicative of a roughness of said wall; characterized in that the friction model further relates the friction factor to a parameter indicative of a property of the drag reducing agent, and that the parameter indicative of a property of the drag reducing agent is an onset wall shear stress or an onset wave number,
wherein the parameter indicative of a property of the drag reducing agent is a function of at least a polymer radius of gyration of the drag reducing agent and an onset constant dependent on the drag reducing agent and the solvent.

21. The method according to claim 20, wherein the drag reducing agent includes a polymer.

22. The A-method according to claim 20, wherein the parameter indicative of a property of the drag reducing agent is determined according to:

$$\frac{1}{\sqrt{f}} = -4\log_{10}\left[\frac{1.26}{RE\sqrt{f}} + + \frac{\varepsilon}{3.7D}\right] - \delta\log_{10}\left[\frac{1}{RE\sqrt{f}}\right] - \delta\log_{10}\left[\sqrt{2}\,Dw*\right]$$

wherein f is the friction factor, Re is the Reynolds number, ϵ is the roughness, D is the diameter of the conduit, δ is a slope increment parameter, and w * is the onset wave number.

23. The method according to claim 20, wherein the parameter indicative of a property of the drag reducing agent is determined according to:

$$\frac{1}{\sqrt{f}} = -4\log_{10}\left[\frac{1.26}{RE\sqrt{f}} + + \frac{\varepsilon}{3.7D}\right] - \delta\log_{10}\left[\frac{1}{RE\sqrt{f}}\right] - \delta\log_{10}\left[\sqrt{2}\,Dw*\right]$$

wherein f is the friction factor, $Re_a$ is Reynolds number for annular flow, ϵ is the roughness, $D_e$ is an effective diameter of an annular portion of the conduit, δ is a slope increment parameter, and w * is the onset wave number.

24. A method of simulating transport of a fluid for causing a dissolution process of at least a part of a material of a material formation surrounding the conduit, the conduit having a conduit radius; the method comprising establishing a transport model of fluid transport along a longitudinal axis of the conduit, the transport model including a model of a lateral fluid transport away from said longitudinal axis into the material formation; characterized in that the method comprises calculating an effective conduit radius dependent on at least one parameter indicative of an estimated distribution of flow channels generated in the material formation by the dissolution process
   wherein the at least one parameter indicative of an estimated distribution of flow channels includes an estimated spatial frequency of the flow channels along a circumference of the conduit,
   wherein the frequency is estimated from an area of a surface of a conduit section, a length of the conduit section and the estimated length of the flow channels,
   wherein the frequency is determined according to;

$$\psi_{wh} = \frac{A}{LL_{wh}}$$

wherein $\psi_{wh}$ is the frequency of flow channels, A is the surface area of predetermined conduit section, e.g. a bore hole section, L is a length of the conduit section, and $L_{wh}$ is an estimated length of the flow channels.

25. The method according to claim 24, wherein the at least one parameter indicative of an estimated distribution of flow channels includes an estimated length of the flow channels.

26. The method according to claim 24, wherein the effective conduit radius is determined according to;

$$r_{we} = r_w + L_{wh}[1 - e^{\zeta \phi wh}]$$

wherein $r_{we}$ is the effective conduit radius, and ζ is a predetermined constant.

27. The method according to claim 24, wherein the estimated length of the flow channels is estimated from the amount of fluid transported and an incremental channel length per unit fluid.

28. The method according to claim 27, wherein the estimated incremental channel length per unit fluid is scaled by a scaling parameter so as to account for a branching of worm holes due to the lateral fluid transport.

* * * * *